(12) United States Patent
Botello et al.

(10) Patent No.: US 9,844,993 B2
(45) Date of Patent: Dec. 19, 2017

(54) TWO-PIECE ADJUSTABLE STRUT SPACER

(71) Applicant: TAP Worldwide, LLC, Compton, CA (US)

(72) Inventors: Richard A. Botello, Lomita, CA (US); Jason M. Miyamoto, San Diego, CA (US)

(73) Assignee: TAP Worldwide, LLC, Compton, CA (US)

( * ) Notice: Subject to any disclaimer, the term of this patent is extended or adjusted under 35 U.S.C. 154(b) by 0 days.

(21) Appl. No.: 14/923,777

(22) Filed: Oct. 27, 2015

(65) Prior Publication Data

US 2016/0121686 A1 May 5, 2016

Related U.S. Application Data

(60) Provisional application No. 62/073,781, filed on Oct. 31, 2014.

(51) Int. Cl.
*B60G 17/02* (2006.01)

(52) U.S. Cl.
CPC ...... *B60G 17/021* (2013.01); *B60G 2202/312* (2013.01); *B60G 2204/124* (2013.01); *B60G 2204/4402* (2013.01); *B60G 2204/61* (2013.01); *B60G 2500/30* (2013.01)

(58) Field of Classification Search
CPC ............ B60G 17/021; B60G 2202/312; B60G 2204/61; B60G 2204/124; B60G 2500/30; B60G 2204/4402
See application file for complete search history.

(56) References Cited

U.S. PATENT DOCUMENTS

| | | | |
|---|---|---|---|
| 4,618,162 A | 10/1986 | Specktor et al. | |
| 4,641,853 A | 2/1987 | Specktor et al. | |
| 4,684,150 A | 8/1987 | Specktor et al. | |
| 4,831,744 A | 5/1989 | Specktor et al. | |
| 4,836,578 A * | 6/1989 | Soltis ............... | B60G 17/01933 267/64.16 |
| 4,838,573 A | 6/1989 | Specktor et al. | |
| 4,940,373 A | 7/1990 | Specktor | |
| 4,953,278 A | 9/1990 | Specktor et al. | |
| 4,955,926 A | 9/1990 | Specktor et al. | |
| 4,970,801 A | 11/1990 | Specktor et al. | |
| 4,971,484 A | 11/1990 | Specktor | |
| 5,033,179 A | 7/1991 | Specktor | |
| 5,044,659 A | 9/1991 | Specktor et al. | |
| 5,104,141 A | 4/1992 | Grove et al. | |
| 5,163,699 A | 11/1992 | Specktor | |

(Continued)

FOREIGN PATENT DOCUMENTS

| | | |
|---|---|---|
| CA | 2628303 | 9/2011 |
| CA | 2788468 | 2/2013 |
| CN | 102183270 | 4/2013 |

*Primary Examiner* — Darlene P Condra
(74) *Attorney, Agent, or Firm* — Austin Holt; Eric Severson

(57) ABSTRACT

Strut spacers are described that include at least a male component comprising an externally threaded surface and a female component comprising an internally threaded surface. Rotation of the male component or the female component adjusts the height of the strut spacer prior to installation within the motor vehicle. The strut spacer can optionally include a locking ring to lock the height of the strut spacer before installation.

20 Claims, 36 Drawing Sheets

(56) References Cited

U.S. PATENT DOCUMENTS

| | | | |
|---|---|---|---|
| 5,333,423 A * | 8/1994 | Propst | E04F 15/02476 248/188 |
| 6,131,883 A | 10/2000 | Spears et al. | |
| 6,257,601 B1 | 7/2001 | Spears et al. | |
| 6,293,724 B1 | 9/2001 | Spears et al. | |
| 6,363,685 B1 * | 4/2002 | Kugler | E04F 15/02183 52/126.6 |
| 6,382,645 B1 | 5/2002 | Gravelle et al. | |
| 6,827,184 B1 * | 12/2004 | Lin | B60G 11/15 188/321.11 |
| 7,210,693 B2 | 5/2007 | Ingalls et | |
| D556,524 S | 12/2007 | Ryshavy et al. | |
| D556,525 S | 12/2007 | Ryshavy et al. | |
| 7,331,589 B2 | 2/2008 | Ingalls et al. | |
| 7,513,514 B1 | 4/2009 | Schlosser et al. | |
| 7,537,225 B2 | 5/2009 | Ryshavy et al. | |
| 7,725,747 B2 | 5/2010 | Zimmer et al. | |
| 7,780,178 B2 | 8/2010 | Ryshavy et al. | |
| 7,784,800 B2 * | 8/2010 | Michel | B60G 7/04 267/175 |
| 7,850,183 B1 | 12/2010 | Ryshavy et al. | |
| 7,857,335 B2 * | 12/2010 | Wilfried | B60G 17/021 280/124.145 |
| 8,075,005 B1 | 12/2011 | Ryshavy et al. | |
| 8,317,210 B1 | 11/2012 | Ryshavy et al. | |
| 8,317,211 B1 | 11/2012 | Ryshavy et al. | |
| D672,288 S | 12/2012 | Ryshavy et al. | |
| 8,480,108 B2 | 7/2013 | Ryshavy et al. | |
| 8,720,923 B2 | 5/2014 | Ryshavy et al. | |
| 8,733,717 B2 * | 5/2014 | Devereux | A47B 91/02 248/188.2 |
| 9,097,273 B2 * | 8/2015 | Branning | F16B 37/043 |
| 9,140,325 B2 * | 9/2015 | Cox | B60G 15/063 |
| 9,211,775 B1 * | 12/2015 | Ryshavy | B60G 17/021 |
| 2002/0171223 A1 * | 11/2002 | Chan | F16F 1/041 280/124.179 |
| 2008/0191440 A1 * | 8/2008 | Ryshavy | B60G 7/003 280/124.1 |
| 2009/0261542 A1 * | 10/2009 | McIntyre | B60G 17/021 280/6.157 |
| 2011/0023385 A1 * | 2/2011 | Knight, III | B66F 3/08 52/126.6 |
| 2011/0221109 A1 * | 9/2011 | Hinouchi | B60G 15/063 267/221 |
| 2013/0255187 A1 * | 10/2013 | Zemlin | B67B 3/2066 53/317 |
| 2014/0375002 A1 * | 12/2014 | Coombs | B60G 17/0523 280/6.157 |
| 2016/0221410 A1 * | 8/2016 | Mersmann | B60G 17/021 |
| 2016/0289993 A1 * | 10/2016 | Volin | E04H 12/2292 |

* cited by examiner

FIG. 27
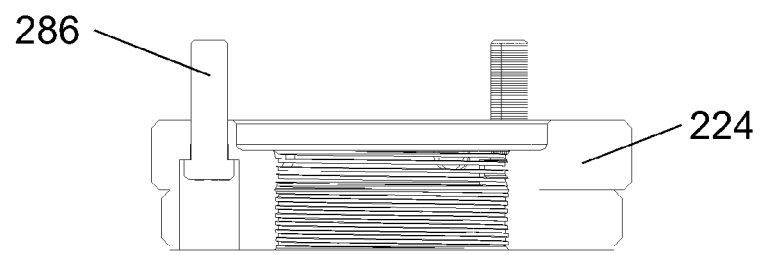
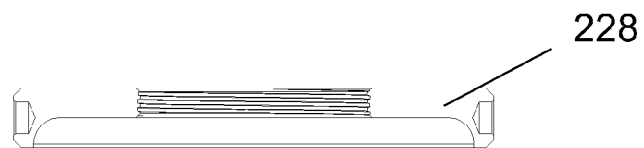
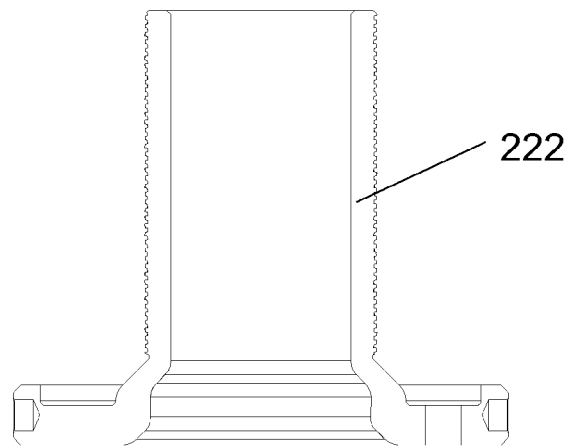

TWO-PIECE ADJUSTABLE STRUT SPACER

INCORPORATION BY REFERENCE TO ANY PRIORITY APPLICATIONS

Any and all applications identified in a priority claim in the Application Data Sheet, or any correction thereto, are hereby incorporated by reference herein and made a part of the present disclosure. This application claims the priority benefit under 35 U.S.C. §119(e) of U.S. Provisional Application No. 62/073,781 filed Oct. 31, 2014, the disclosure of which is hereby incorporated by reference in its entirety and should be considered a part of this specification.

BACKGROUND

Field

The present invention generally relates to strut spacers. More particularly, the present invention relates to two-piece adjustable strut spacers allowing the user to adjust the height before installation.

Description of the Related Art

A strut spacer is typically a post-market modification to the height of the frame of a vehicle relative to the wheels. A strut spacer is part of a vehicle's suspension system and can be referred to as a suspension lift or a lift kit. The strut spacer provides higher ground clearance, such as to accommodate larger tires or to level the frame to match the lift originally provided by the manufacturer.

Front and rear strut spacers can be connected the front and rear strut assemblies, respectively. The strut spacers function to increase the distance between the upper end of the strut assembly and the vehicle frame. Prior art strut spacers include a solid block that extends laterally between the strut assembly and the frame. These blocks are not adjustable by the user. Therefore, one set of blocks must be replaced with a different set blocks to adjust the lift. The distance that the frame lifts depends on the height of the solid block.

Although strut spacers have been in use for a significant period of time, there is a demand for continued improvement in the design and operation of strut spacers. For example, there is a constant push to reduce the cost of manufacturing, the ease of assembly, and the simplicity of components, while increasing functionality by being able to adjust the amount of lift.

SUMMARY OF THE INVENTION

In some embodiments, a strut spacer for use with a strut assembly and a frame of a motor vehicle is provided. The strut spacer can include a first component having an externally threaded surface. The first component can have a first set of holes configured to align with the pre-fabricated holes in the strut assembly. The strut spacer can include a second component having an internally threaded surface. The internally threaded surface of the second component can engage the externally threaded surface of the first component. The second component can have a second set of holes configured to align with pre-fabricated holes in the frame. In some embodiments, rotation of the first component or the second component adjusts the height of the strut spacer prior to installation within the motor vehicle.

In some embodiments, a method of using a strut spacer with a strut assembly and a frame of a motor vehicle is provided. The method can include the step of providing the strut spacer having a first component comprising an externally threaded surface and a second component comprising an internally threaded surface. The method can include the step of rotating the first component or the second component to adjust the height of the strut spacer. The method can include the step of locking the height of the strut spacer. The method can include the step of disengaging the strut assembly from the frame. The method can include the step of coupling the strut spacer to the strut assembly and the frame.

BRIEF DESCRIPTION OF THE DRAWINGS

These and other features, aspects and advantages of the present strut spacers are described herein with reference to drawings of certain preferred embodiments, which are provided for the purpose of illustration and not limitation.

FIG. 27 is a cross-sectional view of the strut spacer of FIG. 24.

DETAILED DESCRIPTION OF THE PREFERRED EMBODIMENT

Preferred embodiments of the strut spacer assembly include two (or possibly more) strut spacers used to alter ground clearance or lift of a vehicle. One or more of the strut spacers may include components that can comprise segments or portions. However, the use of the term "component" does not imply any particular structure or configuration. The component may be any suitable shape that permits the function of the component, for instance to engage or disengage another component. Certain embodiments are illustrated and/or described herein.

Typically, the strut spacer adjusts the height or relative vertical position of the strut assembly relative to the frame. The characteristics of the strut spacer, including the height or axial length of the strut spacer, will impact the lift of the vehicle. A strut spacer can be provided that spans between the strut assembly and the frame of the vehicle. For convenience, the strut spacer is referred to as having an upper end near the frame and a lower end near the strut assembly where the strut spacer is interposed between the frame and the strut assembly. The illustrated strut spacer has a longitudinal axis that extends from the upper end to the lower end. In some embodiments, the male component is near the upper end and the female component is near the lower end. In other embodiments, the male component is near the lower end and the female component is near the upper end. In some configurations, the orientation shown in the figures can be reversed (e.g., the upper end becomes the lower end). These, and other relative terms (top, bottom, middle, above, below, etc.) are used for convenience and with respect to the particular orientation shown in the referenced figures and are not intended to be limiting, unless otherwise indicated or made clear from the particular context. Thus, the strut spacer can also be used in other orientations, or adapted for use in orientations other than those illustrated. The embodiments disclosed herein are well-suited for use in most vehicles, including cars, trucks, and SUVs; however other uses are contemplated, such as golf-carts, ATVs and other motor vehicles.

Figure 1:
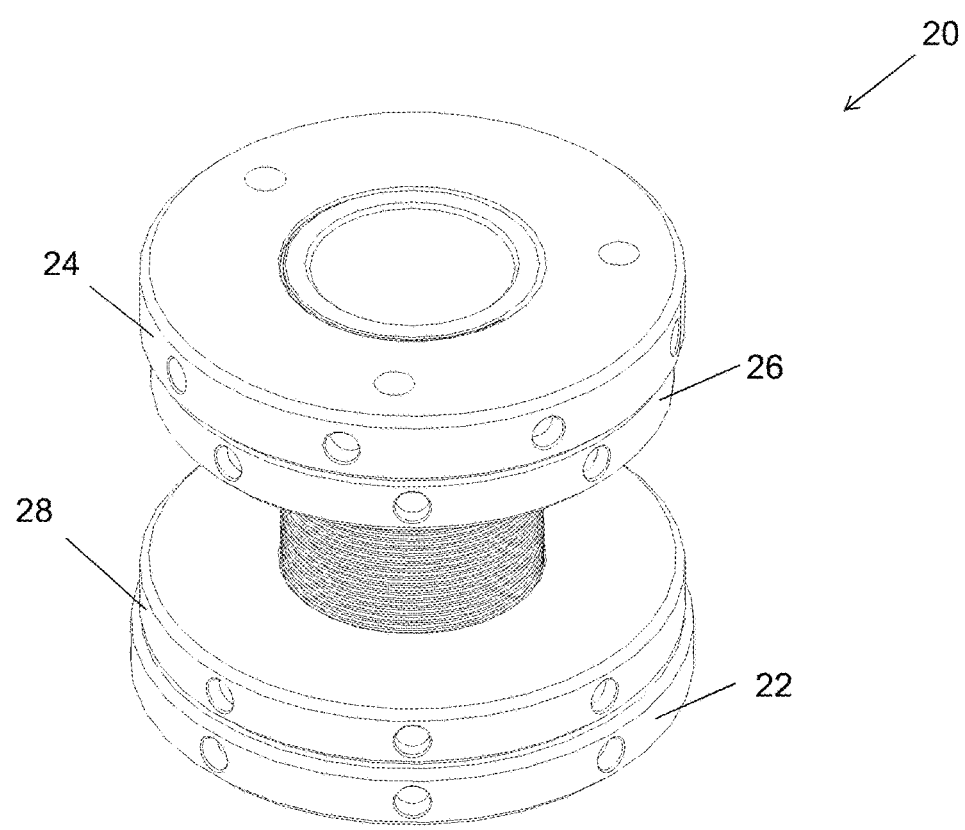
FIG. 1 is a perspective view of an embodiment of a strut spacer.

With reference to FIG. 1, a strut spacer 20 is shown. The strut spacer 20 can also be referred to as a two-piece adjustable strut spacer. The strut spacer 20, in the simplest form, comprises two components: a male component 22 and a female component 24. In the illustrated configuration, the male component 22 is a unitary component that functions to engage the female component 24. In the illustrated configuration, the female component 24 is a unitary component that functions to engage the male component 22. In some configurations, the two components can comprise a male threaded component and a female threaded component, wherein the two threaded components cooperate to provide the adjustability. Through the use of these two components, the height of the strut spacer 20 can be adjusted.

In some configurations, the strut spacer 20 can optionally include a locking ring 26. The locking ring 26 can reduce the ability to rotate the male component 22 and the female component 24 when the strut spacer 20 is being assembled before installation. The locking ring 26 can prevent rotation before the strut spacer 20 is installed in the vehicle. Once installed, the bolts couple the male component 22 to the strut assembly and bolts couple the female component 24 to the frame. In the installed configuration, the bolts counteract rotation of the male component 22 and the female component 24. In the illustrated configuration, the locking ring 26 does not function to adjust the height of the strut spacer 20. Rather, the locking ring 26 functions to lock the relative position of the male component 22 and the female component 24. In some configurations, the locking ring 26 can be used to secure the relative rotational position of the two components 22, 24 before installation. In some configurations, the locking ring 26 can be used to secure the relative axial position the two components 22, 24 before installation. In some configurations, the locking component can be used to secure one or both of the relative rotational and relative axial positions of the two components 22, 24 before installation.

In some configurations, the strut spacer 20 can optionally include a cover 28. In the illustrated configuration, the cover 28 does not function to adjust the height of the strut spacer 20. Rather, the cover 28 functions to cover bolts extending through the male component 22. The cover 28 can reduce or eliminate the likelihood of the bolts backing out. The cover 28 can enhance the aesthetics of the strut spacer 20. In some configurations, the cover 28 can enhance the aesthetics of the strut spacer 20 by matching the upper end and the lower end of the strut spacer 20 when the strut spacer 20 is assembled. For instance, in some embodiments, the cover 28 can have approximately the same height or shape as the locking ring 26. For instance, in some embodiments, the cover 28 and the male component 22 can have approximately the same height or shape as the female component 24.

Figure 2:
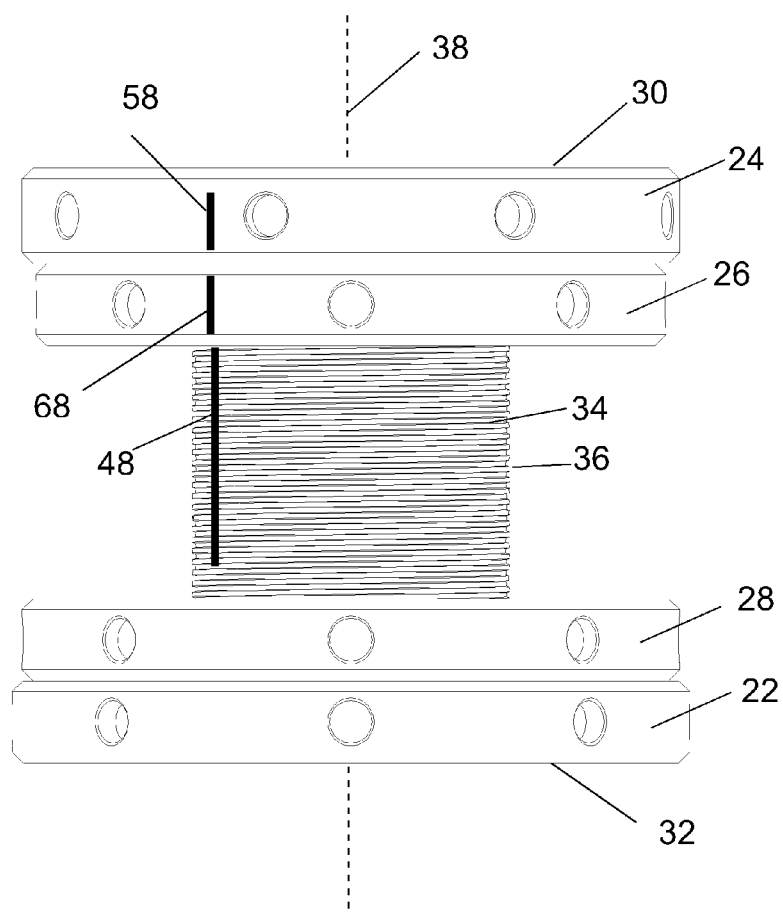
FIG. 2 is a front view of the strut spacer of FIG. 1.
Figure 3:
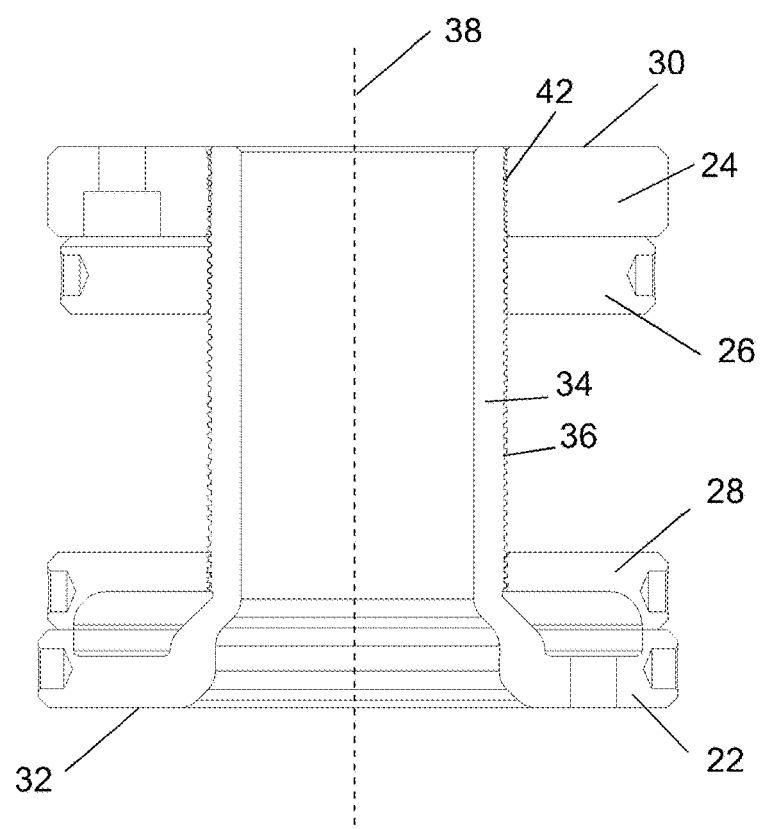
FIG. 3 is a cross-sectional view of the strut spacer of FIG. 1.

Referring now to FIGS. 2 and 3, the strut spacer 20 is designed to adjust the relative distance between an upper mounting surface 30 and a lower mounting surface 32. The strut spacer 20 permits adjustment of the distance between the mounting surfaces 30, 32 of the strut spacer 20 by adjusting the male component 22 relative to the female component 24 or the female component 24 relative to the male component 22. The strut spacer 20 can include a longitudinal axis 38. The male component 22 can be coupled to the female component 24 along the longitudinal axis 38 when the strut spacer 20 is assembled. The suspension height can be adjusted along the longitudinal axis 38, as described in greater detail herein. Loads can be transferred from the male component 22 to the female component 24 along the longitudinal axis 38 when the strut spacer 20 is assembled. Prior to installation in a vehicle, the male component 22 is rotatable with respect to the female component 24. The height of the strut spacer 20 can be adjusted as desired. Once installed, the strut spacer 20 is prevented from rotating by the bolts that couple the strut spacer to the vehicle. In some embodiments, the upper mounting surface 30 can be coupled to the frame (not shown). The lower mounting surface 32 can be coupled to the strut assembly (not shown).

The strut spacer 20 can be installed in the vehicle in the orientation shown in FIGS. 2 and 3. The male component 22 can be near the lower end of the strut spacer 20 and the female component 24 can be near the upper end of the strut spacer 20. In this orientation, the male component 22 couples to the strut assembly and the female component 24 couples to the frame. Therefore, the upper mounting surface 30 is a surface of the female component 24 and the lower mounting surface 32 is a surface of the male component 22. The opposite orientation is possible, wherein the male component 22 couples to the frame and the female component 24 couples to the strut assembly. Therefore, the upper mounting surface 30 is a surface of the male component 22 and the lower mounting surface 32 is a surface of the female component 24.

The male component 22 can include a longitudinally extending portion 34 that extends along the longitudinal axis 38. The longitudinally extending portion 34 can include an engagement feature 36. The engagement feature 36 of the male component 22 can be threads, as shown. In other embodiments, the engagement feature 36 of the male component 22 can be a ratchet, detent, pawl, gears, or other mechanism designed to permit releasable engagement between the male component 22 and the female component 24. The engagement feature 36 can be axially offset from the lower mounting surface 32.

The female component 24 can include a complementary engagement feature 42. The complementary engagement feature 42 of the female component 24 can be threads, as shown in FIG. 3. In other embodiments, the complementary engagement feature 42 of the female component 24 can be a ratchet, detent, pawl, or other mechanism designed to permit releasable engagement between the male component 22 and the female component 24. The engagement feature 42 can be offset from the upper support surface 30.

The engagement feature 36 of the male component 22 can include external threads and the male component 22 can be described as having male threads. The engagement feature 42 of the female component 24 can include internal threads and the female component 24 can be described as having female threads. The male component 22 and the female component 24 can include right handed threads. Therefore rotation of the male component 22 in a first direction would move the male component 22 away from the user. The height of the strut spacer 20 would shorten. The length of the male component 22 within the female component 24 would increase. Rotation of the male component 22 in a second direction, opposite the first direction, would move the male component 22 toward the user. The height of the strut spacer 20 would lengthen. The length of the male component 22 within the female component 24 would decrease. Alternatively, the male component 22 and the female component 24 can include left handed threads.

The cross-sectional shape of the threads can have any suitable shape. The thread form may be rectangular, square, triangular, trapezoidal or any other shape. The lead and pitch can be selected based upon the incremental height adjustment desired for one rotation of the male component 22. The major diameter can be 2.925-2.920". Other dimensions are contemplated (e.g., 2", 2.1", 2.2", 2.3", 2.4", 2.5", 2.6", 2.7", 2.8", 2.9", 3", 3.1", 3.2", 3.3", 3.4", 3.5", 3.6", 3.7", 3.8", 3.9", 4" etc.). The pitch diameter can be 2.899-2.894". Other dimensions are contemplated (e.g., 2", 2.1", 2.2", 2.3", 2.4", 2.5", 2.6", 2.7", 2.8", 2.9", 3", 3.1", 3.2", 3.3", 3.4", 3.5", 3.6", 3.7", 3.8", 3.9", 4" etc.). The minor diameter can be 2.869." Other dimensions are contemplated (e.g., 2", 2.1", 2.2", 2.3", 2.4", 2.5", 2.6", 2.7", 2.8", 2.9", 3", 3.1", 3.2", 3.3", 3.4", 3.5", 3.6", 3.7", 3.8", 3.9", 4" etc.).

Referring to FIG. 2, the strut spacer 20 can include markings on one or more components. In some configurations, the male component 22 can include a longitudinally extending line 48 or other marking(s) (e.g., line, dash, arrow, icon, graduated scale or the like). The longitudinally extending line or marking 48 can extend along the entire longitudinally extending portion 34 or a portion thereof. Desirably, the length of the marking 48 is sufficient to allow the marking 48 to remain visible even though at least a portion of the male component 22 is received within the female component 24. In the illustrated configuration, the longitudinally extending line 48 begins at the upper end of the male component 22. The longitudinally extending line 48 extends parallel to the longitudinal axis 38. The longitudinally extending line 48 can extend along the entire longitudinally extending portion 40 or a portion thereof. The female component 24 can include a longitudinally extending line 58 or other marking(s) (e.g., line, dash, arrow, icon, graduated scale or the like). The longitudinally extending line 58 can extend along the entire female component 24 or a portion thereof. In the illustrated configuration, the longitudinally extending line 58 begins at the lower end of the female component 24. The longitudinally extending line 58 extends parallel to the longitudinal axis 38.

The markings 48, 58 can serve a variety of functions. For instance, the markings 48, 58 can indicate when mounting holes in the male component 22 align with mounting holes in the female component 24. The strut spacer 20 utilizes pre-fabricated holes in the strut assembly and the frame during installation. The mounting holes on male component 22 and the mounting holes on the female component 24 will be aligned with these pre-fabricated holes for mounting to the pre-fabricated holes in the strut assembly and the frame or an adaptor could be used. Aligning the markings 48, 58 can be a proxy for aligning the mounting holes on male component 22 and the female component 24 with these pre-fabricated holes.

The pre-fabricated holes in the frame and the strut assembly can be equally spaced around a circumference. The corresponding mounting holes of the male component 22 can be equally spaced around a circumference. Therefore, any of the mounting holes of the male component 22 can align with any of the mounting holes of the female component 24. In this configuration, the female component 24 can include multiple longitudinally extending lines 58 or other marking(s). For instance, the female component 24 could have the same number of longitudinally extending line 58 or other marking(s) as the number of bolts extending through the female component 24 (e.g., three longitudinally extending lines 58 corresponding to three bolts).

The pre-fabricated holes in the frame and the strut assembly can be unequally spaced around a circumference. The corresponding mounting holes of the male component 22 can be unequally spaced around a circumference. Therefore, only one of the mounting holes of the male component 22 aligns with each mounting hole of the female component 24. In this configuration, the female component 24 can include a single longitudinally extending line 58 or other marking. The marking 58 would align with the marking 48 when the mounting holes on male component 22 and the female component 24 are aligned.

In some configurations, the strut spacer 20 can include a scale. The scale can be displayed on the male component 22 such that adjusting the height of the strut spacer 20 covers a portion of the scale. The scale can be an integrated marking with the longitudinally extending line 48 or other marking(s). In other embodiments, the scale is a separate marking which is radially spaced from the longitudinally extending line 48. The scale can be in descending order from the upper end of the longitudinally extending portion 34 to the lower end. The marking on the scale closest to the female component 24 can indicate the height of the installed strut spacer 20. During use, a portion of the scale will be covered by the female component 24. The scale can be covered or uncovered depending upon the rotation of the male component 22 and the female component 24. The scale can include numbers, letters, tick marks (e.g., a ruler) or other scales known in the art. The scale can be used to adjust two or more strut spacers 20 to the same height. For instance, each strut spacer 20 can include an identical scale. The user can refer to the scales to determine if the two or more strut spacers 20 are set to the same length or height.

The markings 48, 58 can be manufactured by any method known in the art. In some configurations, the markings 48, 58 are laser etched, engraved, painted, or cut. The markings 48, 58 can be formed from the same process or different processes. The markings 48, 58 can be solid, dashed or ticked. The scale can be manufactured by any method known in the art. In some configurations, the scale is laser etched, engraved, painted, or cut. The scale can be formed from the same process or different processes as the markings 48, 58.

In some methods of use, before installation, the male component 22 can be rotated to change the height of the strut spacer 20 while the female component 24 is held stationary. In some methods of use, before installation the male component 22 can be held stationary while the female component 24 is rotated. In some methods of use, both the male component 22 and the female component 24 are rotated either simultaneously or alternatively to adjust the height of the strut spacer 20. The male component 22 and the female component 24 can be movable to change the height of the strut spacer 20 before installation. The simplicity of the design requires no intermediate component to adjust the height. Rather only two components are used to change the height in the illustrated configuration: the male component 22 and the female component 24. Adjusting either or both of these two components of the strut spacer 20 can cause a change in height.

Figure 4:
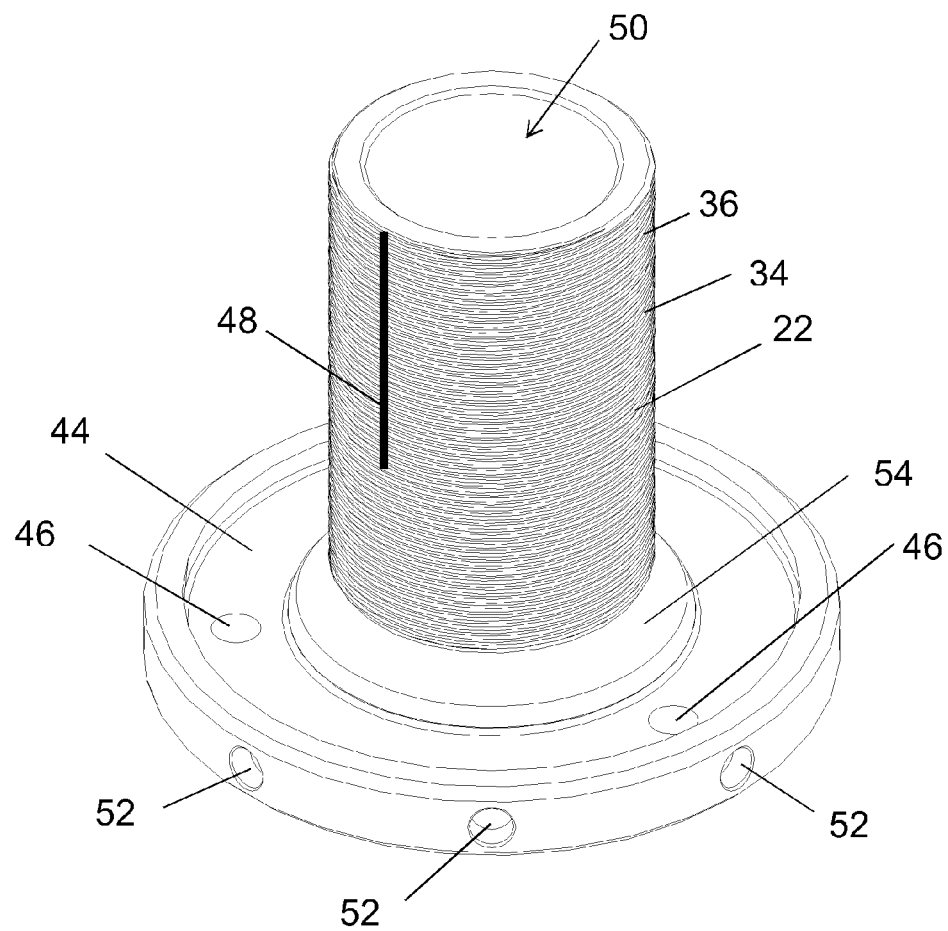
FIG. 4 is a perspective view of a male component of the strut spacer of FIG. 1.
Figure 5:
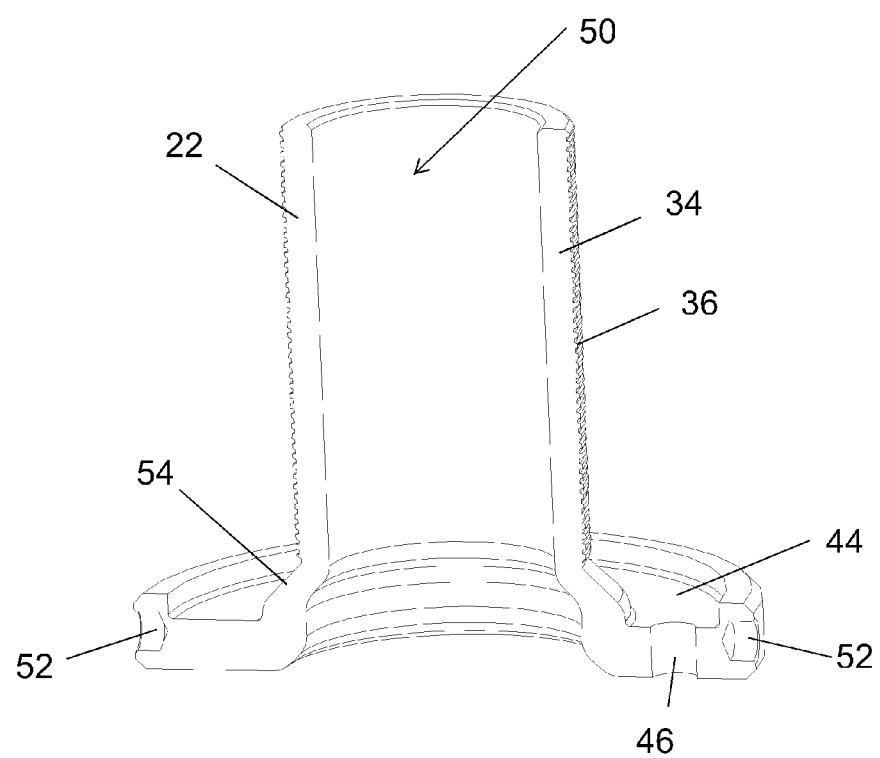
FIG. 5 is a cross-sectional view of the male component of the strut spacer of FIG. 1.

The male component 22 is shown in greater detail in FIGS. 4-5. The male component 22 can include longitudinally extending portion 34 as described above. The lower end of the longitudinally extending portion 34 can include an interface 44. The interface 44 can include a plurality of holes 46 configured to mount the male component 22 to the vehicle (not shown). In some methods of use, the interface 44 connects the male component 22 to the strut assembly. The holes 46 may be arranged in a pattern that matches the corresponding pre-fabricated pattern of mounting holes on the strut assembly. The interface 44 can include three holes 46. Other configurations of holes 46 are possible depending on the make and model of the vehicle (e.g., one hole, two holes, four holes, five holes, six holes, etc.). The holes 46 can be equally or unequally spaced around the male component 22 (e.g., equally spaced around the lumen 50). The interface 44 can have a larger diameter than the diameter of the longitudinally extending portion 34. The interface 44 can create a flange extending radially outward from the longitudinally extending portion 34.

The male component 22 can include the engagement feature 36, as described above. The engagement feature 36 can be disposed on the outer surface of the longitudinally extending portion 34. The engagement feature 36 can extend along the entire longitudinally extending portion 34 as shown or a portion thereof. For instance, the engagement feature 36 can extend from the upper end of the male component 22 along at least a portion of the longitudinally extending portion 34.

The male component 22 can include a lumen 50. The lumen 50 can extend along the longitudinal axis 38. The lumen 50 can extend through the entire male component 22 as shown or a portion thereof. For instance, the lumen 50 can extend through only the longitudinally extending portion 34 or the interface 44. The longitudinally extending portion 34 can be shaped like a hollow tube due to the lumen 50. In other embodiments, the longitudinally extending portion 34 is a solid structure and the lumen 50 does not extend therethough. The interface 44 can be ring shaped due to the lumen 50. Other configurations are possible based upon the outer shape of the interface 44 and the shape of the lumen 50. In other embodiments, the interface 44 is continuous and the lumen 50 does not extend therethough.

The lumen 50 can be sized to accept a portion of the strut assembly, for instance the pre-fabricated strut cap. The lumen 50 can include a taper 54 near the lower mounting surface 32 to ease the entry of the strut assembly within the lumen 50. The male component 22 can include a taper 54 to transition from the longitudinally extending portion 34 to the interface 44. The male component 22 can include a taper 54 if the strut cap has a larger diameter than the diameter of the longitudinally extending portion 34. Other configurations are possible based upon the outer shape of the longitudinally extending portion 34 and the shape of the lumen 50.

The interface 44 of the male component 22 can include a plurality of recesses 52 that extend from the side surface of the interface 44. The recesses 52 can be evenly or unevenly spaced. The interface 44 can include eight recesses 52 but other configurations are contemplated (e.g., three, four, five, six, seven, nine, ten, etc.). The recesses 52 can be designed to engage a tool. For instance, the recesses 52 can be designed as a socket configured to mate with common types of screwdrivers or punch (e.g., hex head, fluted, square, Philips©, slotted, 5-node). In the illustrated embodiment, the tool to engage the recesses 52 is not specially designed. The recesses 52 can facilitate the rotation of components of the strut spacer 20. For instance, the recesses 52 can facilitate the grip of the male component 22 when the male component 22 is rotated. The recesses 52 can facilitate holding the male component 22 stationary as the female component 24, the locking ring 26, or the cover 28 is rotated. In other methods of use, the user rotates the components by hand.

Figure 6:
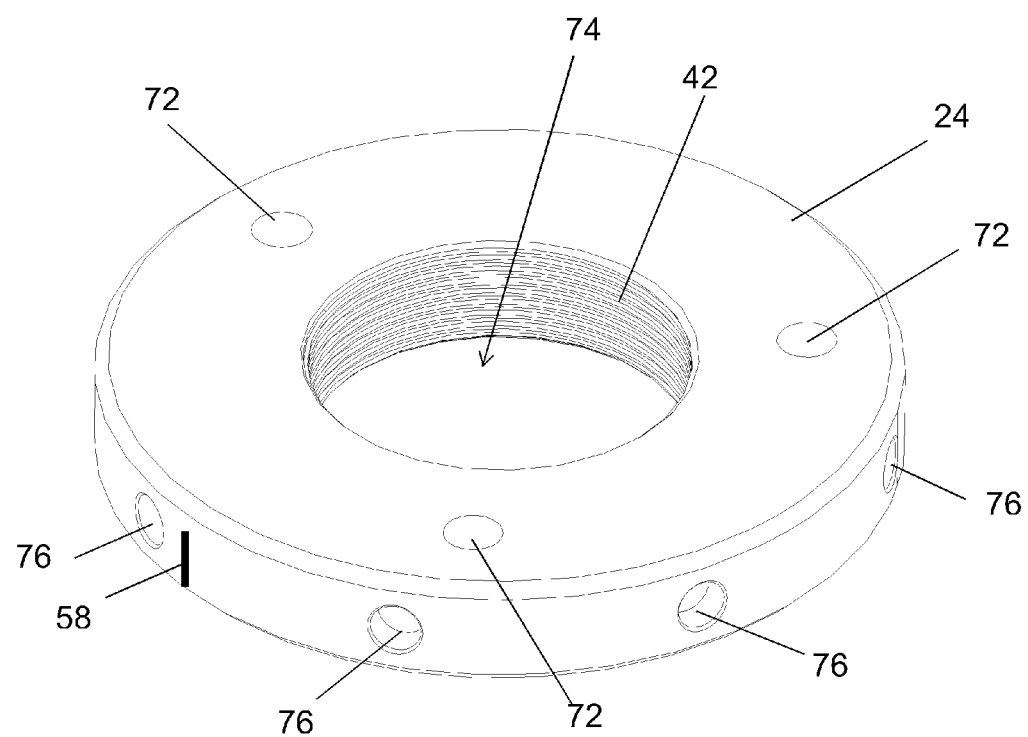
FIG. 6 is a perspective view of a female component of the strut spacer of FIG. 1.
Figure 7:
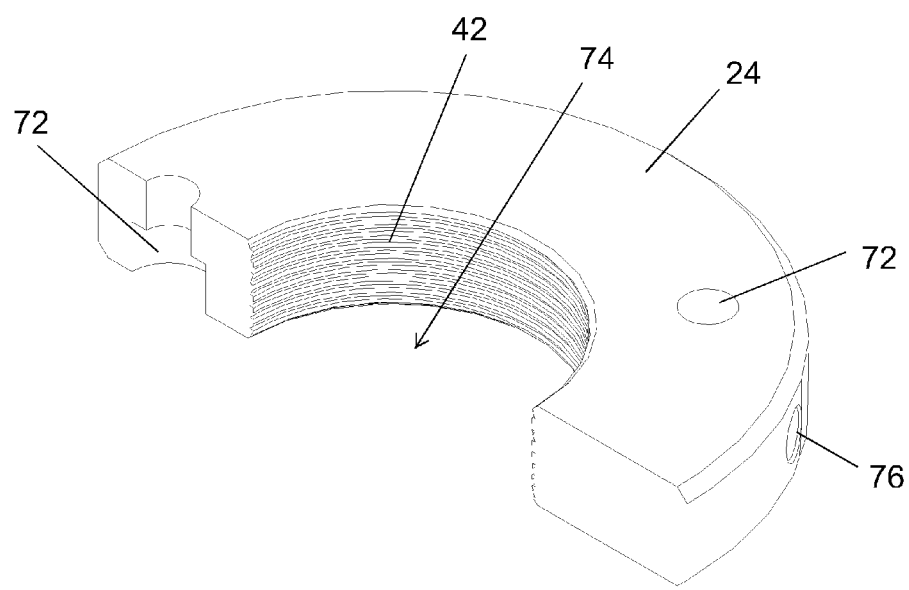
FIG. 7 is a cross-sectional view of the female component of the strut spacer of FIG. 1.

The female component 24 is shown in greater detail in FIGS. 6-7. In the illustrated embodiment, the female component 24 has a substantially uniform diameter. The female component does not include an outwardly extending interface. The diameter of the female component can be approximately equal to the diameter of the interface 44, shown in FIGS. 4-5. The female component 24 can include a plurality of holes 72 configured to mount the female component 24 to the vehicle (not shown). The holes 72 can extend through the female component 24. The female component 24 can include appropriately shaped holes to accommodate the head of the bolts (e.g., the holes 72 can have a larger diameter near the lower end of the female component 24 and a smaller diameter near the upper end of the female component 24). In other methods of use, the bolts extend in the opposite direction. The female component 24 can include appropriately shaped holes to accommodate a corresponding nut of the bolt (e.g., the holes 72 can have a larger diameter near the lower end of the female component 24 and a smaller diameter near the upper end of the female component 24). In this configuration, the bolts are less likely to interfere with the male component 22 or the locking ring 26.

In some methods of use, the female component 24 is coupled to the frame. The holes 72 may be arranged in a pattern that matches the corresponding pre-fabricated pattern of mounting holes on the frame. The female component 24 can include three holes 72. Other configurations of holes 72 are possible depending on the make and model of the vehicle (e.g., one hole, two holes, four holes, five holes, six holes, etc.). The holes 72 can be equally or unequally spaced around the female component 24.

The female component 24 can have a lumen 74. The lumen 74 can extend through the entire female component 24 as shown or a portion thereof. The lumen 74 can extend along the longitudinal axis 38. The complementary engagement feature 42 can be disposed within the lumen 74. The complementary engagement feature 42 can extend through the entire female component 24 as shown or a portion thereof. For instance, the complementary engagement feature 42 can extend from the lower end of the female component 24 through a portion of the female component 24.

The female component 24 can be ring shaped due to the lumen 74. Other configurations are possible based upon the outer shape of the female component 24 and the shape of the lumen 74. The female component 24 can be a hollow tube due to the lumen 74. Other configurations are possible based upon the outer shape of the female component 24 and the shape of the lumen 74.

The female component 24 can include a plurality of recesses 76 that extend from a side surface of the female component 24. The recesses 76 can facilitate the grip of the female component 24 when the female component 24 is rotated. The recesses 76 can facilitate holding the female component 24 stationary as the male component 22, the locking ring 26, or the cover 28 is rotated. The recesses 76 can be evenly or unevenly spaced. The female component 24 can include eight recesses 76 but other configurations are contemplated (e.g., three, four, five, six, seven, nine, ten, etc.).

Referring back to FIGS. 2, 4 and 6, in methods of use, the female component 24 can be advanced from the upper end of the male component 22 toward the interface 44. Alternatively, the male component 22 can be advanced from the lower end of the female component 24. The adjustment of the strut spacer 20 can be accomplished by rotating the male component 22, rotating the female component 24, or rotating both the female component 24 and the male component 22. The user adjusts the position of the male component 22 and the female component 24 until the upper mounting surface 30 and the lower mounting surface 32 are located in the desired position. The distance 96 between the upper mounting surface 30 and the lower mounting surface 32 will be amount of lift provided by the strut spacer 20 when installed.

In the pre-fabricated condition, one or more bolts extend from the strut assembly to the frame (e.g., no strut spacer is installed). Upon installation of the strut spacer 20, the holes 46 of the interface 44 align with pre-fabricated holes on the strut assembly of the vehicle (not shown). The holes 72 of the female component 24 align with pre-fabricated holes on the frame (not shown). As a proxy for this alignment with the parts of the vehicle, the user may align the holes 46 of the male component 22 with the holes 72 of the female component 24. The alignment of the holes 46, 72 can be accomplished prior to installation. In some methods of use, the strut assembly and the frame are not modified during installation of the strut spacer 20 (e.g., no additional holes are drilled, no pre-fabricated parts are modified or bent). The method can utilize the pre-fabricated holes of the frame and the strut assembly.

As described herein, the longitudinally extending lines or markings 48, 58 can be aligned. For instance, the longitudinally extending lines or markings 48, 58 can indicate when holes 44 in the male component 22 align with holes 72 in the female component 24. Aligning the longitudinally extending lines or markings 48, 58 can be a proxy for aligning the male component 22 and the female component 24 with the pre-fabricated holes in the frame and strut assembly. In some methods, one or more tools can facilitate this alignment. For instance, one or more rods can be inserted into the holes 46 and 72. In some configurations, the rods could be attached to a ring to define an alignment jig or the like. The holes 46, 72 can be aligned through any method known in the art.

During installation, bolts are extended through the holes 46, 72. An upper set of bolts can extend through holes 72 and a similar or identical set of bolts can extend through holes 46. The bolts can couple the female component 24 with the frame of the vehicle such that the upper mounting surface 30 is adjacent to the frame (not shown). The bolts can extend upward through the female component 24. The bolts can couple the interface 44 of the male component 22 with the strut assembly such that the lower mounting surface 32 is adjacent to the strut assembly. The bolts can extend downward through the male component 22. In this configuration, the bolts are less likely to interfere with the cover 28 or the locking ring 26. In other methods of use, the bolts extend in the opposite direction.

Once secured to the vehicle, the strut spacer 20 cannot be rotated to change the height of the strut spacer 20. Thus, in the illustrated configuration, the strut spacer 20 can be adjusted before using the bolts to install the strut spacer 20 into the vehicle. The strut spacer 20 may be affixed to the strut assembly in a similar manner as the manufacturer secures the strut assembly to the frame (e.g., utilizing the same holes in the strut assembly and frame, utilizing the same bolts and nuts). The bolts can be secured in any manner known in the art, including complementary nuts.

In use, the female component 24 and the male component 22 would be adjusted to the desired height while the strut spacer 20 is off the vehicle, in an uninstalled condition. In the uninstalled condition, the male component 22 can rotate and the female component 24 can rotate. In the uninstalled condition, neither the male component 22 nor the female component 24 are constrained in movement by being fixed to the vehicle. In the uninstalled condition, the male component 22 is not coupled to the strut assembly and the female component 24 is not coupled to the frame. In use, one or more strut spacers 20 may be adjusted to the same height. For instance, in some methods of a pair of strut spacers 20 is adjusted to the same height. The height can be measured through any method known in the art.

The strut spacer 20 can include the locking ring 26 or other suitable locking component to function to lock the relative positions (e.g., height and/or rotational orientation) of the female component 24 and the male component 22 before installation. The locking ring 26 is shown in greater detail in FIGS. 8-9. The locking ring 26 can have a lumen 90. The lumen 90 of the locking ring 26 can align or substantially align with the lumen 74 of the female component 24. The lumen 90 can extend through the entire locking ring 26 along the longitudinal axis 38. The locking ring 26 can include a complementary engagement feature 92. The complementary engagement feature 92 of the locking ring 26 can be threads, as shown. The complementary engagement feature 92 can be disposed within the lumen 90. The complementary engagement feature 92 can extend through the entire locking ring 26 as shown or a portion thereof. For instance, the complementary engagement feature 92 can extend from the upper end of the locking ring 26 along a portion of the lumen 90.

The locking ring 26 can include a plurality of recesses 94 that extend generally from a side surface of the locking ring 26. The recesses 94 can facilitate the grip of the user when the user rotates the locking ring 26. The recesses 94 can facilitate holding the locking ring 26 stationary as the male component 22 or the female component 24 is rotated. The recesses 94 can be evenly or unevenly spaced. The locking ring 26 can include eight recesses 94 but other configurations are contemplated (e.g., three, four, five, six, seven, nine, ten, etc.).

In some configurations, the locking ring 26 can include a longitudinally extending line 68 or other marking (e.g., line, dash, arrow, icon, graduated scale or the like). The longitudinally extending line 68 can extend along the entire locking ring 26 or a portion thereof. Referring back to FIG. 2, the longitudinally extending line 68 extends parallel to the longitudinal axis 38. The longitudinally extending line 68 can serve a variety of functions. For instance, the marking 68 can indicate when the locking ring 26 is sufficiently tightened. The longitudinally extending line or marking 68 of the locking ring 26 can align with the longitudinally extending line or marking 48 of the male component 22 when the locking ring 26 is sufficiently tightened. The longitudinally extending line or marking 68 of the locking ring 26 can align with the longitudinally extending line or marking 58 of the female component 24 when the locking ring 26 is sufficiently tightened. This visual indicator can reduce or eliminate the likelihood of over tightening of the locking ring 26. The longitudinally extending lines or markings 48, 58, 68 can align when the strut spacer 20 is assembled and locked.

In some configurations, the plurality of recesses 94 of the locking ring 26 can align or substantially align with the plurality of recesses 76 of the female component 24 when the locking ring 26 is sufficiently tightened. This visual indicator can reduce or eliminate the likelihood of over tightening of the locking ring 26. Over tightening can strip the threads on the strut spacer 20.

The complementary engagement feature 92 of the locking ring 26 can be identical or substantially similar to the complementary engagement feature 42 of the female component 24. In the illustrated embodiment, the threads of the female component 24 and the locking ring 26 are identical (e.g., same size, same pitch, same material, etc.) The diameter of the lumen 74 of the female component 24 and the diameter of the lumen 90 of the locking ring 26 can be identical or substantially similar.

Figure 8:
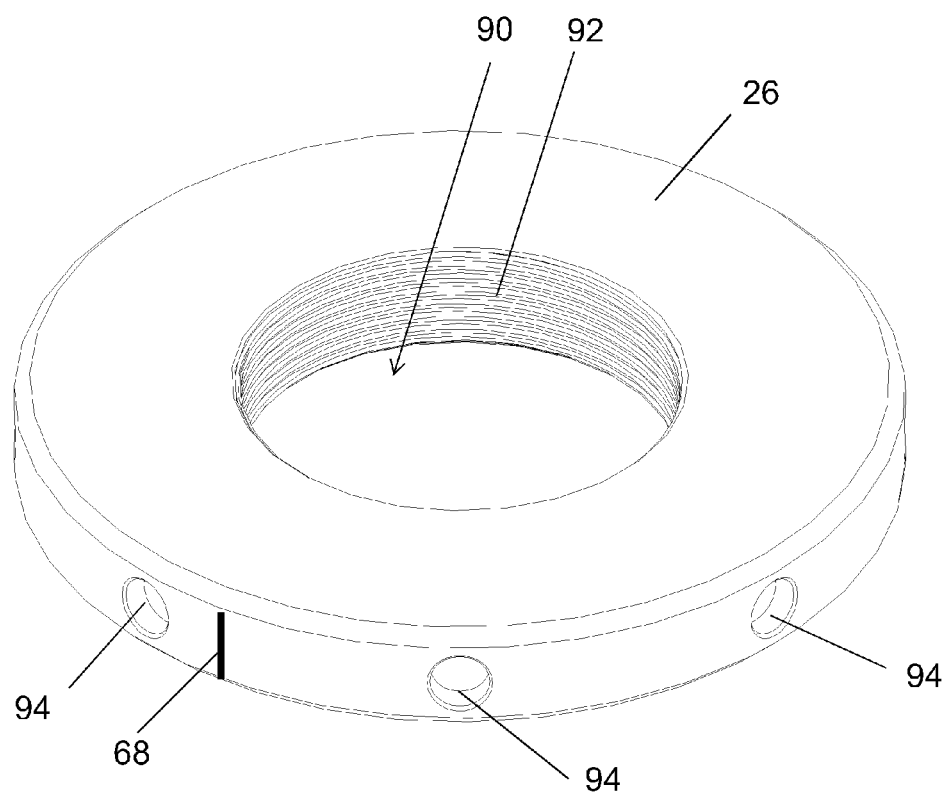
FIG. 8 is a perspective view of an optional locking ring of the strut spacer of FIG. 1.
Figure 9:
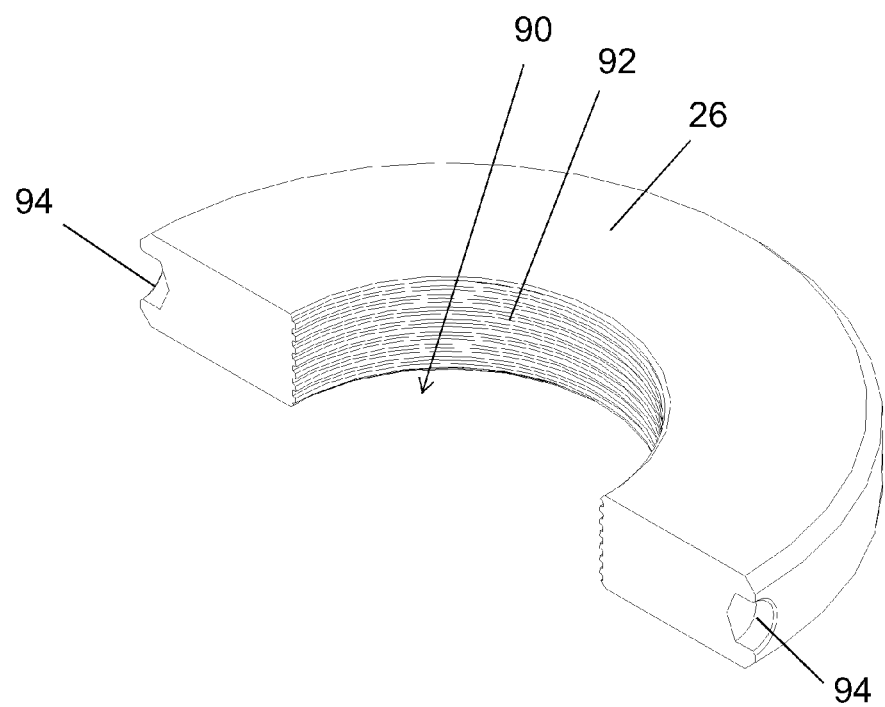
FIG. 9 is a cross-sectional view of the optional locking ring of the strut spacer of FIG. 1.

Referring to FIGS. 2, 4, and 8, in one method of use, the locking ring 26 can be advanced from the upper end of the male component 22 toward the interface 44. This can be accomplished by rotating the locking ring 26, rotating the male component 22, or rotating both the locking ring 26 and the male component 22. Then the female component 24 can be advanced from the upper end of the male component 22 toward the interface 44. This can be accomplished by rotating the female component 24, rotating the male component 22, or rotating both the female component 24 and the male component 22. In some methods of use, the locking ring 26 may need to be further advanced after the female component 24 is coupled to the male component 22. This can be accomplished by rotating the locking ring 26, rotating the male component 22, or rotating both the locking ring 26 and the male component 22.

The locking ring 26 can be used to substantially prevent rotation of the female component 24 and the male component 22 before installation. In use, the user adjusts the position of the male component 22 and the female component 24 until the upper mounting surface 30 and the lower mounting surface 32 are located in the desired position. Prior to installation in a vehicle, one or more bolts are extended through the holes 72 in the female component 24. For instance, the head of the bolt can be located near the lower end of the female component and the shaft of the bolt can extend upward from the female component. In some embodiments, the bolts are place prior to adjusting the locking ring 26 and prior to installation. In some embodiments, the bolts are extended through holes 72 prior to coupling the female component 24 with the male component 22. In some embodiments, the bolts are extended through holes 72 after to coupling the female component 24 with the male component 22. Once the bolts are extended through holes 72, the locking ring 26 can be advanced toward the female component 24. The locking ring 26 can be advanced toward the upper end of the male component 22 away from the interface 44. The locking ring 26 can be placed in abutment with the female component 24. This action frictionally locks the strut spacer 20 in the desired orientation. In some embodiments, the locking ring 26 is placed in abutment prior to coupling the bolts to the vehicle.

The female component 24 and the locking ring 26 are used together to reduce or eliminate the likelihood of self-loosening before installation. The locking ring 26 can be thinner (e.g., smaller height) than the female component 24. In other applications, the locking ring 26 is approximately the same height as the female component 24. The locking ring 26 can have the same diameter as the female component 24. In other applications, the locking ring 26 has a smaller diameter than the female component 24. In other applications, the locking ring 26 has a larger diameter than the female component 24. In some methods of use, tightening the locking ring 26 against the female component 24 before installation achieves a locking effect. For instance, the locking ring 26 can be threaded onto the male component 22 first. Then the female component 24 can be threaded onto the male component 22 to the desired location. The female component 24 can be held stationary. Then the locking ring 26 can be tightened down on top of the female component 24. Continued tightening jams the thread on the male component 22 against the bottom flanks of the locking ring 26 and the top flanks of the female component 24 before installation. In this position, relative thread movement is not possible. Two or more markings 48, 58, 68 can be aligned when the locking ring 26 is sufficiently tightened. Those skilled in the art may devise additional mechanisms for achieving a locking effect.

In other methods of use, a specific order of steps is followed to achieve a greater locking effect before installation. The locking ring 26 can be threaded onto the male component 22 to the desired location. Two markings 48, 68 can be aligned as a proxy for alignment of the holes 46, 72. The locking ring 26 can be held stationary. The female component 24 can be tightened to the full torque value. While the female component 24 is tightened onto the locking ring 26, the load increases. Two or more markings 48, 58, 68 can be aligned when the female component 24 is sufficiently tightened.

Figure 10:
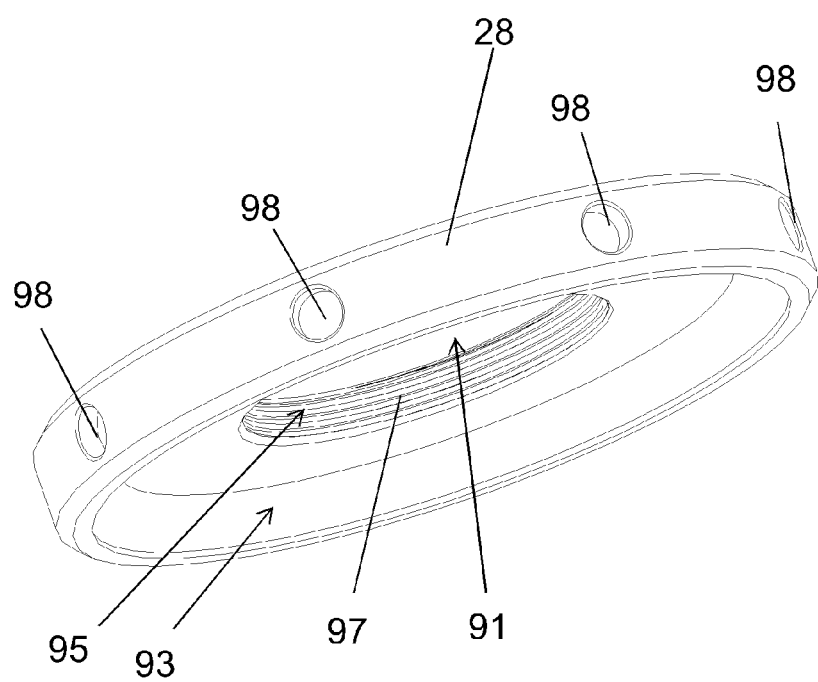
FIG. 10 is a perspective view of an optional cover of the strut spacer of FIG. 1.
Figure 11:
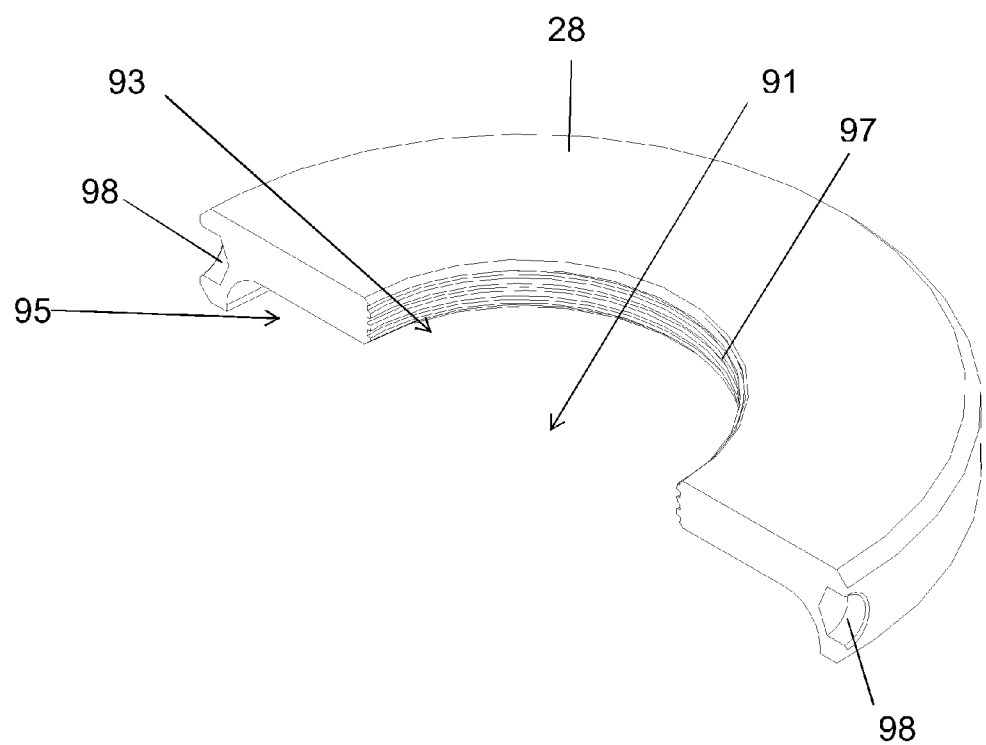
FIG. 11 is a cross-sectional view of the optional cover of the strut spacer of FIG. 1.

The strut spacer 20 can include the cover 28, which is shown in greater detail in FIGS. 10-11. The cover 28 can have a lumen 91. The lumen 91 can have a first portion 93 that can align or substantially align with the lumen 74 of the female component 24. The lumen 91 can have a second portion 95 having a greater diameter than the first portion. The second portion can accommodate the heads of the bolts extending through the male component 22. The cover 28 can include a complementary engagement feature 97. The complementary engagement feature 97 of the cover 28 can be threads, as shown. The complementary engagement feature 97 can be disposed within the lumen 91. The complementary engagement feature 97 can extend through the entire cover 28 or a portion thereof as shown. For instance, the complementary engagement feature 97 can extend from the upper end of cover 28 along a portion of the lumen 91, such as the first portion 93. The complementary engagement feature 97 functions to couple the cover 28 to the male component 22. This reduces or eliminates relative translation of the cover 28 along the longitudinal axis 38. In other embodiments, the cover 28 is coupled to the male component 22 by other mechanism. For instance, the cover 28 could form a snap fit with the male component 22. The cover 28 could include a pawl and the male component 22 could include a detent. The cover 28 could form an interference fit with the male component 22. One or more fasteners could couple the cover 28 with the male component 22.

The cover 28 can include a plurality of recesses 98 that extend generally from a side surface of the cover 28. The recesses 98 can facilitate the grip of the user when the user rotates the cover 28. The recesses 98 can facilitate holding the cover 28 stationary as the male component 22 or the female component 24 is rotated. The recesses 98 can be evenly or unevenly spaced. The cover 28 can include eight recesses 94 but other configurations are contemplated (e.g., three, four, five, six, seven, nine, ten, etc.).

Referring to FIGS. 2, 4, and 10, in one method of use, the cover 28 can be advanced from the upper end of the male component 22 toward the interface 44. This can be accomplished by rotating the cover 28, rotating the male component 22, or rotating both the cover 28 and the male component 22. Then the locking ring 26 can be advanced from the upper end of the male component 22 toward the interface 44. Then the female component 24 can be advanced from the upper end of the male component 22 toward the interface 44.

The user adjusts the position of the male component 22 and the female component 24 until the upper mounting surface 30 and the lower mounting surface 32 are located in the desired position. One or more bolts are extended through the holes 46 in the male component 22. The lower set of bolts couples the male component 22 with the strut assembly (not shown). Once the bolts are extended through holes 46, the cover 28 can be advanced toward the interface 44. This can be accomplished by rotating the male component 22, rotating the cover 28, or rotating both the cover 28 and the male component 22. In some embodiments, the bolts are extended through holes 46 prior to coupling the cover 28 with the male component 22. In some embodiments, the bolts are extended through holes 46 after to coupling the cover 28 with the male component 22. In some embodiments, the cover 28 is advanced toward the interface 44 after the locking ring 26 is in a desired position. In some embodiments, the cover 28 is advanced toward the interface 44 before the locking ring 26 is in a desired position.

Figure 12:
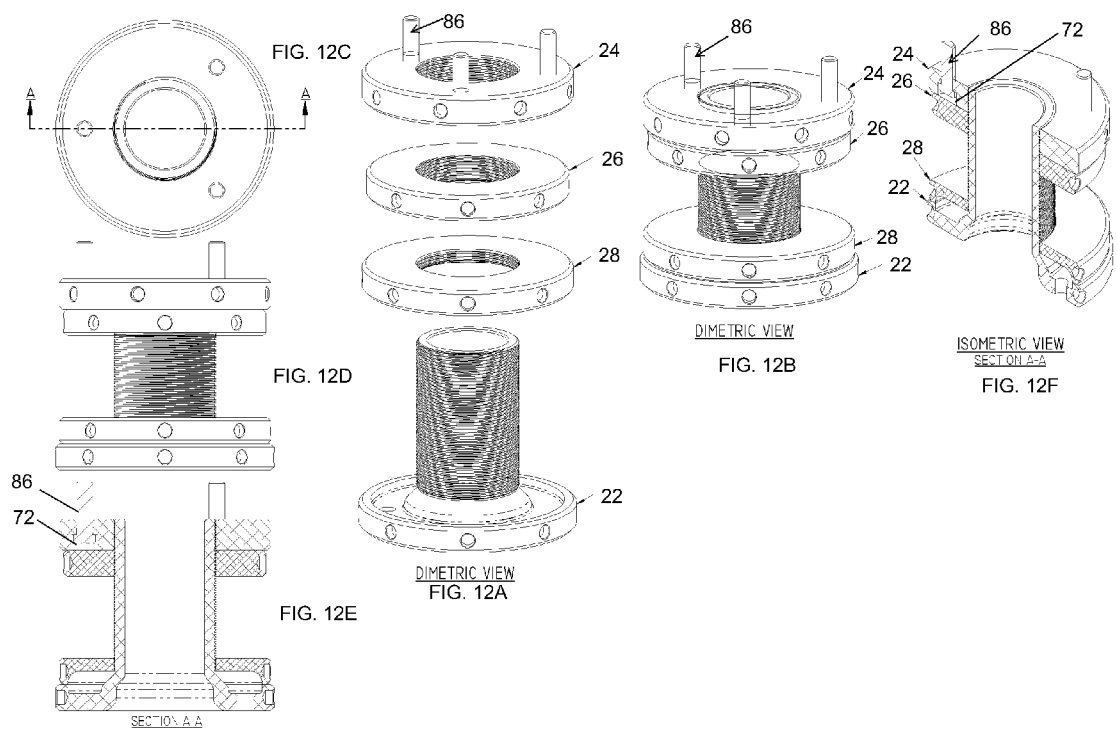
FIGS. 12A-12F are views of the strut spacer of FIG. 1.

FIGS. 12A-12F show views of the strut spacer 20. FIG. 12A is an exploded isometric view. FIG. 12B is an assembled isometric view. FIG. 12C is the top view of the strut spacer 120. FIG. 12D is a side views of the strut spacer 20. FIGS. 12E-12F are cross-sectional views of the strut spacer 20. FIG. 12E-12F show bolts 86 extending through the female component 24. The holes 72 are sized to accept the bolts 86 as shown. In some methods of use, the bolts 86 are placed within the holes 72 prior to locking the locking ring 26. A second set of bolts (not show) extend through the male component 22. The cover 28 reduces or eliminates the likelihood of these bolts backing out.

The strut spacer 20 is not designed to be adjusted after installation. The user adjusts the strut spacer 20 to the desired height prior to installing. Installed, as used herein, denotes the position of the strut spacer 20 when rigidly coupled both the frame in the strut assembly. In some methods of use, the locking ring 26 can be adjusted after installation. In some methods of use, the cover 28 can be adjusted after installation. The positions of the male component 22 and the female component 24 are constrained by bolts 86 once the strut spacer 20 is installed. Therefore, the height of the strut spacer 20 is constrained once the strut spacer 20 is installed.

The strut spacer 20 is not designed to function as a jack. The strut spacer 20 cannot alter the lift of the vehicle once installed. In order to change the height of the strut spacer 20, the strut spacer 20 must be uninstalled from the vehicle or at least have half removed from the vehicle, adjusted while in such an uninstalled condition, and reinstalled in the vehicle. The complex devices that operate as a jack must be specially designed to lift the significant weight of the vehicle once installed. These complex devices may have multiple threads or internal components that facilitate the lift. The materials of such devices must be very tough and resilient to undergo such high loads and stresses that may be placed upon the jack. For instance, suitable materials for such jacks include steel. The material selection causes the jacks to be unable to be manufactured to the same dimensional limits without cracking or ripping. Additionally, the material selection causes the jacks to require protection from rust and corrosion given the environment of use. These jacks have significant drawbacks, which include weight, corrosiveness, and complexity.

The design of the strut spacer 20 differs from other available spacers. The embodiments disclosed herein include a male component 22 that is threaded with male threads and a female component 24 that is threaded with female threads. This configuration allows the user to alter the desired height by rotation of the male component 22, rotation of the female component 24, or rotation of both the male component 22 and the female component 24. As noted herein, the adjustment to the height of the strut spacer 20 occurs prior to installation of the strut spacer 20.

Due to the threaded connections between the male component 22, the female component 24, the locking ring 26, and the cover 28, the embodiments disclosed herein can be assembled and adjusted by hand. The user can grasp the male component 22, the female component 24, the locking ring 26, or the cover 28 to rotate each component. As mentioned herein, the recesses 52, 76, 94, 98 can facilitate the user's grip of each component. For instance, a standard tool can be inserted into the recesses to increase torque. A standard tool could increase the speed by which the components can be rotated. The embodiments disclosed herein do not necessarily require any tools to adjust the male component 22 relative to the female component 24, and vice versa. Rather, the user can adjust the components by hand.

The strut spacer 20 includes one set of threads. All the external threads have the same diameter and all the internal threads have the same diameter. The threads do not extend over a stepped surface (e.g., internal threads with two diameters, external threads with two diameters). The threads can be disposed along the length of the longitudinally extending portion 34 of the male component 22 or limited to a portion thereof. The complementary threads can be disposed along the length of the lumen 74 of the female component 24 or limited to a portion thereof. The embodiments disclosed herein do not include multiple sets of threads.

The embodiments disclosed herein can be constructed of any suitable materials. The male component 22, the female component 24, the locking ring 26, and the cover 28 can be made from the same material or different materials. Suitable materials include metals including aluminum and steel. Suitable materials include low-cost materials. The embodiments disclosed herein can be constructed by any suitable manufacturing process. For instance, the components described herein can be cast or machined. Aluminum is a desirable material because it is more malleable than steel. It can be machined to extreme dimensional limits without cracking during manufacturing. Aluminum is also corrosion resistant without additional treatment, such as paint or other coating.

With reference to FIGS. 13-24, a strut spacer 120 is shown. The strut spacer 120 has components that function in a similar manner as components of strut spacer 20. Similar features will have similar reference numbers. In the illustrated configuration, the male component 122 is a unitary component that functions to engage the female component 124. In the illustrated configuration, the female component 124 is a unitary component that functions to engage the male component 122. The strut spacer 120 can include a male component 122 and a female component 124. Through the use of these two components, the height or length of the strut spacer 120 can be adjusted.

The strut spacer 120 is referred to as having an upper end near the frame and a lower end near the strut assembly. The strut spacer 120 has a longitudinal axis 138 which extends from the upper end to the lower end. The male component 122 can be coupled to the female component 124 along the longitudinal axis 138 when the strut spacer 120 is assembled. The strut spacer 120 is designed to adjust the relative distance between an upper mounting surface 130 and a lower mounting surface 132. The strut spacer 120 permits adjustment of the distance between the mounting surfaces 130, 132 of the strut spacer 120 by adjusting the male component 122 relative to the female component 124 or the female component 124 relative to the male component 122.

Figure 13:
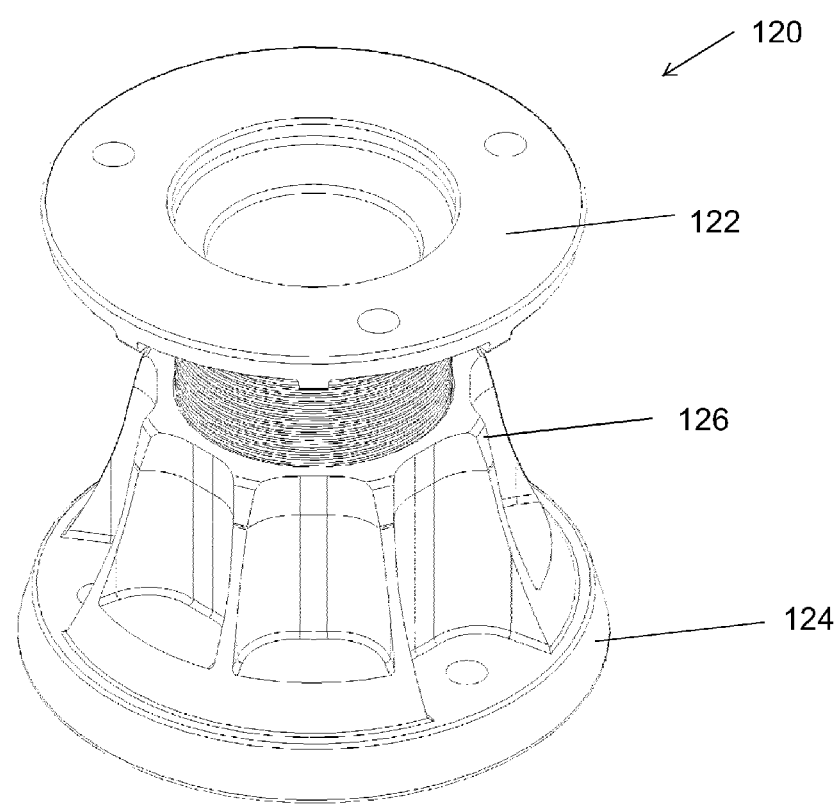
FIG. 13 is a perspective view of an embodiment of a strut spacer.
Figure 14:
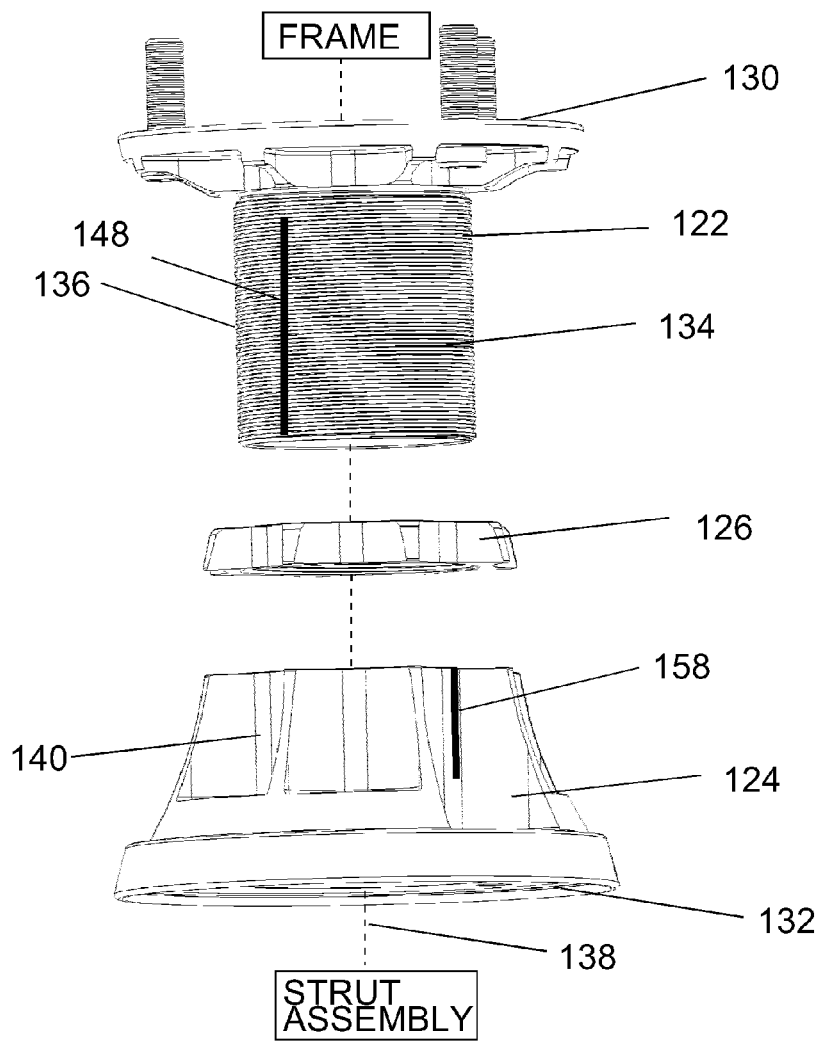
FIG. 14 is an exploded view of the strut spacer of FIG. 13.
Figure 15:
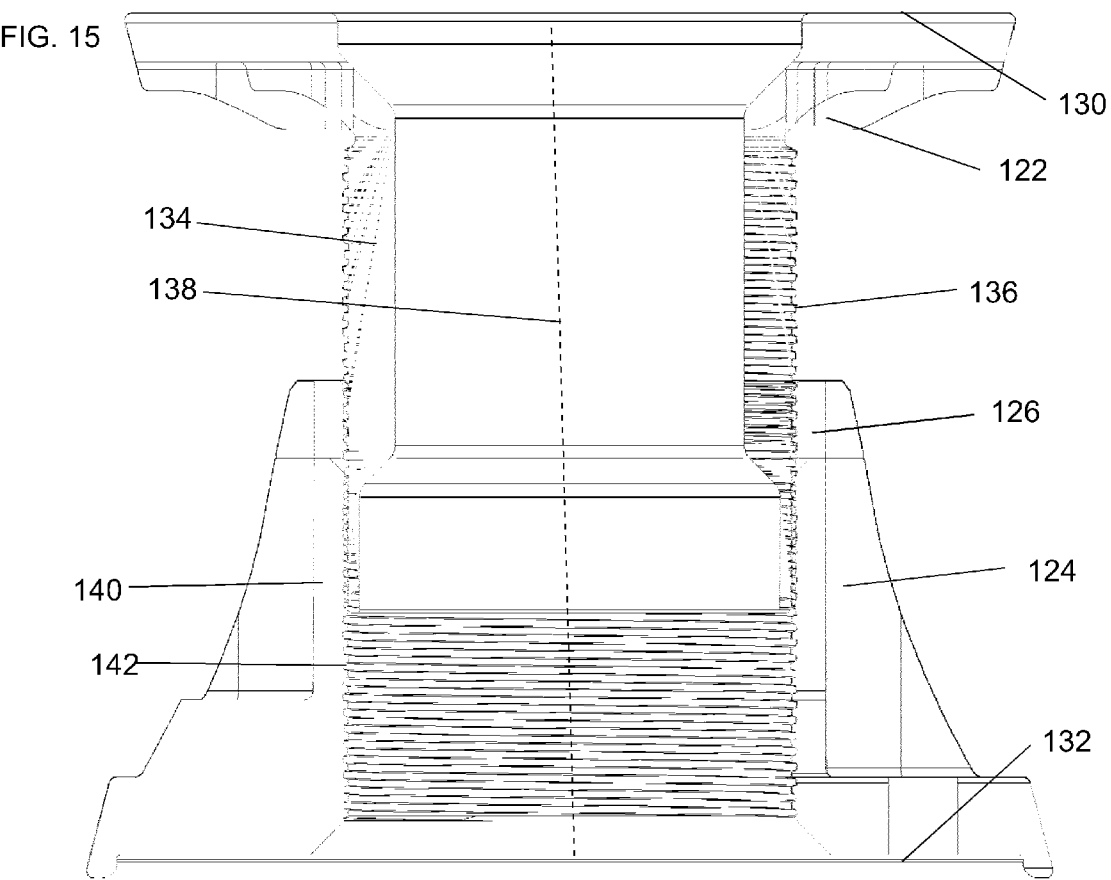
FIG. 15 is a cross-sectional view of the strut spacer of FIG. 13.

The strut spacer 120 can be installed in the vehicle in the orientation shown in FIGS. 13-15. Therefore, the upper mounting surface 130 is a surface of the male component 122 and the lower mounting surface 132 is a surface of the female component 124. The male component 122 can be near the upper end of the strut spacer 120 and the female component 124 can be near the lower end of the strut spacer 120. In this orientation, the upper mounting surface 130 can be coupled to the frame (not shown). The lower mounting surface 132 can be coupled to the strut assembly of the vehicle (not shown). The opposite orientation is possible, wherein the female component 124 couples to the frame and the male component 122 couples to the strut assembly.

Figure 16:
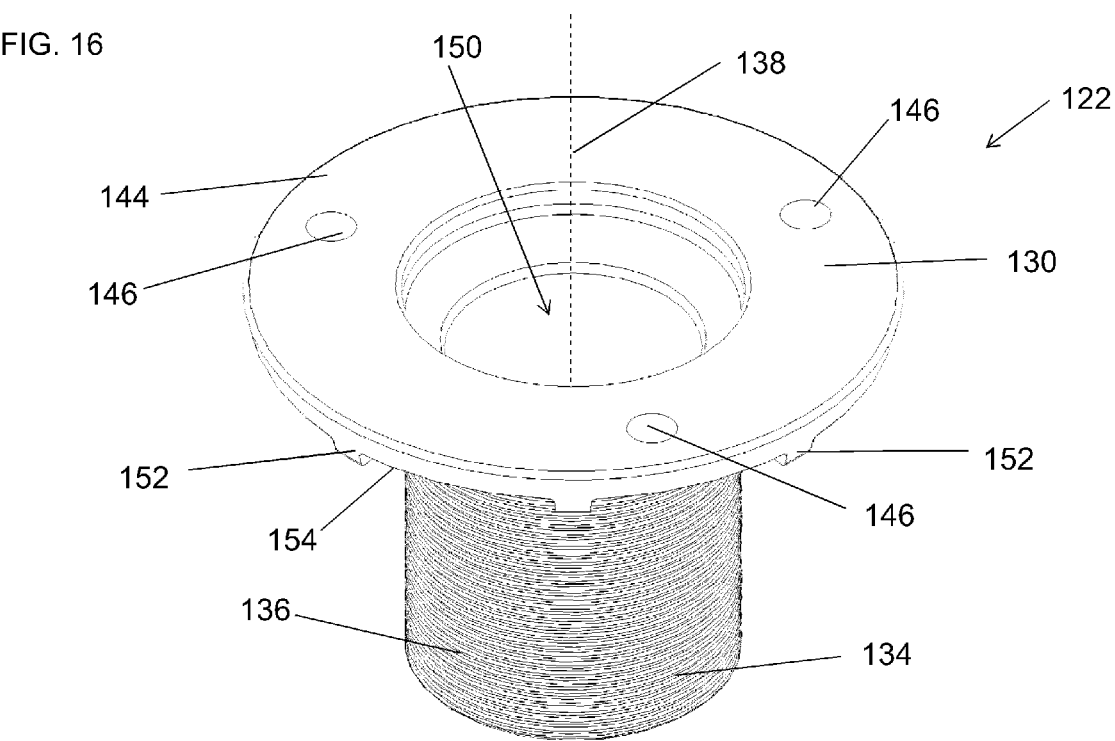
FIG. 16 is a perspective view of a male component of the strut spacer of FIG. 13.
Figure 17:
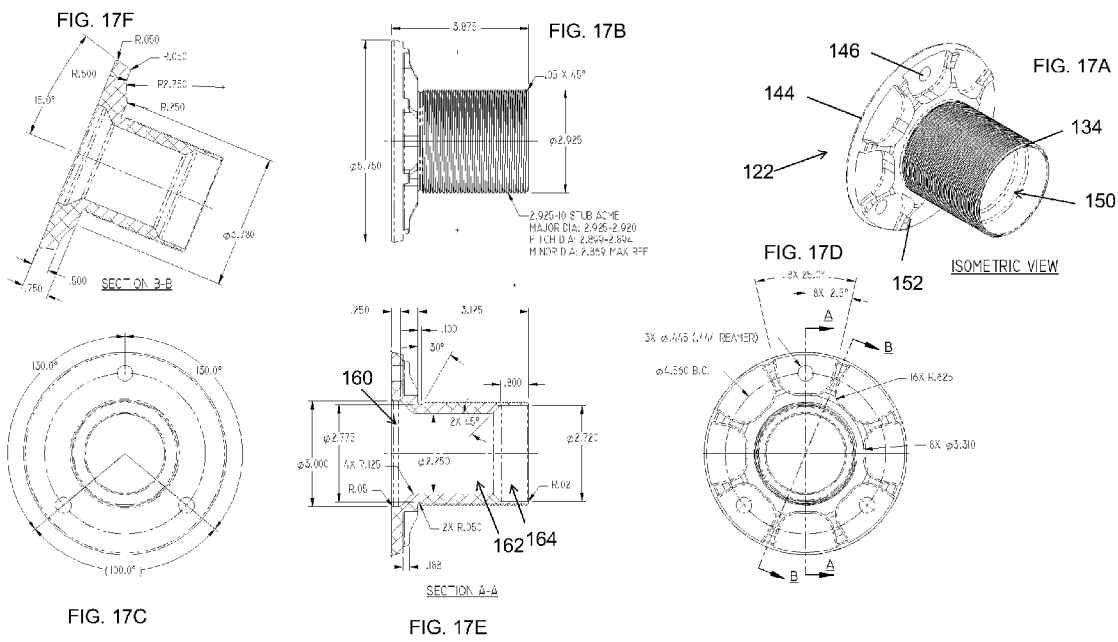
FIGS. 17A-17F are views of the male component of the strut spacer of FIG. 13.

The male component 122 is shown in greater detail in FIG. 16. The male component 122 can include a longitudinally extending portion 134, which can include an engagement feature 136. The engagement feature 136 can be external threads. The engagement feature 136 can be axially offset from the mounting surface 130. The male component 122 can include an interface 144 which can include a plurality of holes 146. The male component 122 can include a lumen 150. The interface 144 of the male component 122 can include a plurality of ridges 152 that extends from a bottom surface 154 of the interface 144. The ridges 152 can reinforce the interface 144. The ridges 152 can facilitate the grip of the user when the user rotates components of the strut spacer 20. The ridges 152 can be evenly or unevenly spaced. The interface 144 can include eight ridges 152 but other configurations are contemplated (e.g., three, four, five, six, seven, nine, ten, etc.).

FIGS. 17A-17F show views of the male component 122. FIG. 17A is an isometric view showing the ridges 152. The ridges 152 can form substantially U-shaped segments. FIG. 17B is a side view. The outer diameter of the interface 144 can be 5.750" but other diameters are contemplated (e.g., 3.5", 3.75", 4", 4.25", 4.5", 4.75", 5", 5.25", 5.5", 5.75", 6", 6.25", 6.5", 6.75", 7" etc.). The length of the male component 122 can be 3.875" but other lengths are contemplated (e.g., 3.5", 3.75", 4", 4.25", 4.5", 4.75", 5", 5.25", 5.5", 5.75", 6", 6.25", 6.5", 6.75", 7" etc.). The length of the longitudinally extending portion 134 can be 3.125" but other lengths are contemplated (e.g., 2.0", 2.5", 2.75", 3", 3.25", 3.5", 3.75", 4", 4.25", 4.5", 4.75", 5", 5.25", 5.5", 6", 6.25", 6.5", 6.75", 7" etc.). This length can correspond to the amount of adjustability of the strut spacer 120. The outer diameter of the longitudinally extending portion 134 can be 2.925" but other diameters are contemplated (e.g., 1.25", 1.5", 1.75", 2", 2.25", 2.5", 2.75", 3", 3.25" 3.5", 3.75", 4", 4.25", 4.5", 4.75", 5", 5.25", 5.5", 5.75", 6", 6.25", 6.5", 6.75", 7" etc.). The diameter of the longitudinally extending portion 134 can be less than the diameter of the interface 144.

FIG. 17C is the top view of the interface 144. The three holes 146 can be unequally spaced around the circumference of the interface 144. The first set of holes can be separated by 130°, the second set of holes can be separated by 130°, and the third set of holes can be separated by 100°. The holes can match the pre-fabricated holes of the frame. Other configurations are contemplated.

FIG. 17D is the bottom view of the interface 144. The holes 146 can have a diameter of 0.445" which can be formed from a 0.444" reamer. Other diameters of holes 146 are contemplated. The holes 146 can be radially spaced along a diameter of 4.560" but other diameters are contemplated (e.g., 1.25", 1.5", 1.75", 2", 2.25", 2.5", 2.75", 3", 3.25" 3.5", 3.75", 4", 4.25", 4.5", 4.75", 5", 5.25", 5.5", 5.75", 6", 6.25", 6.5", 6.75", 7" etc.). This diameter can be selected to match the diameter of the pre-fabricated holes of the frame. This diameter can be selected to be a sufficient distant from the edge of the interface 144 and the edge of the lumen 150. This diameter can be equally spaced between the edge of the interface 44 and the edge of the lumen 150. The bottom view of the interface 144 shows the ridges 152. The edges of an adjacent set of ridges 152 encompass 25° but other angles are contemplated. FIG. 5E is the cross section view taken from line A-A and FIG. 5F is the cross-section view taken from line B-B.

FIGS. 17E and 17F show various dimensions of the male component 122. The lumen 150 can include first portion 160, second portion 162, and third portion 164. The lumen 150 can include first portion 160 near the upper end of the interface 144. The diameter of the first portion 160 can be 3.00". The lumen 150 can include a second portion 162 near the middle of the male component 122, within the longitudinally extending portion 134. The diameter of the second portion 162 can be 2.25". The lumen 146 can include a third portion 164 near the lower end of the male component 122 within the longitudinally extending portion 134. The diameter of the third portion 164 can be 2.72". The third portion 164 can be sized to accept components of the strut assembly (not shown). Other diameters for any of the portions 160, 162, 164 of the lumen 150 are contemplated (e.g., 0.25", 0.5", 0.75", 1", 1.25", 1.5", 1.75", 2", 2.25", 2.5", 2.75", 3", 3.25" 3.5", 3.75", 4", 4.25", 4.5", 4.75", 5"). The lumen 150 can reduce the weight of the male component 122. The lumen 150 can reduce the cost of the male component 122.

Figure 18:
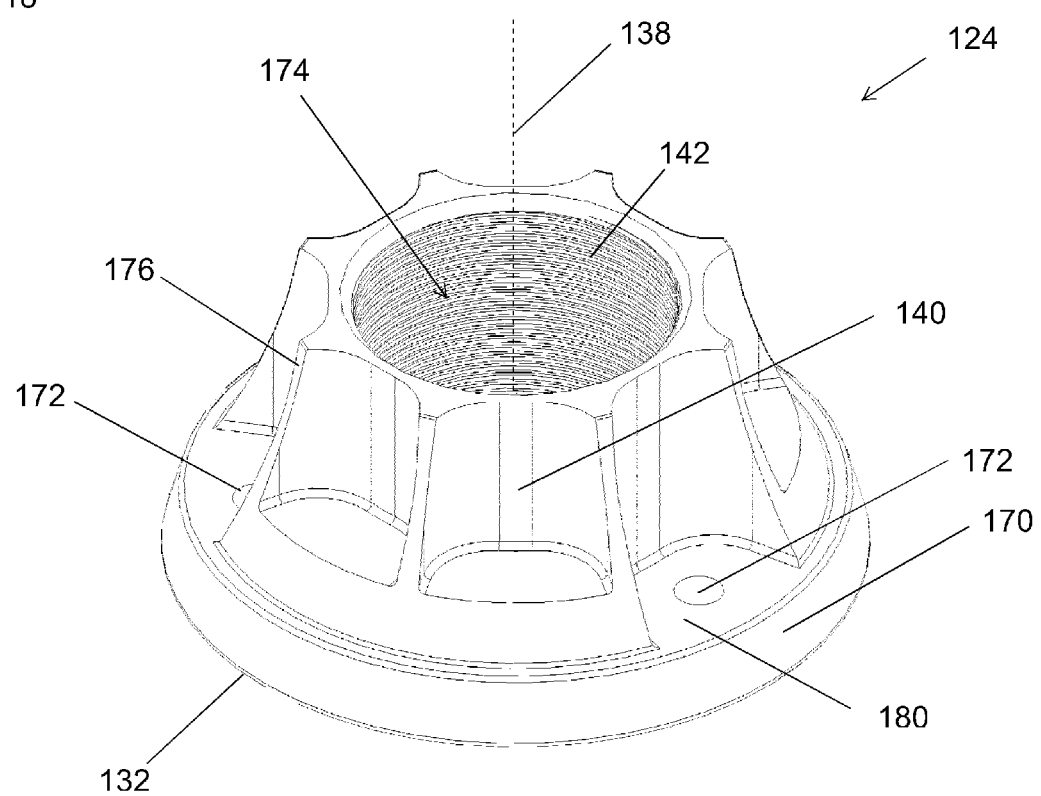
FIG. 18 is a perspective view of a female component of the strut spacer of FIG. 13.
Figure 19:
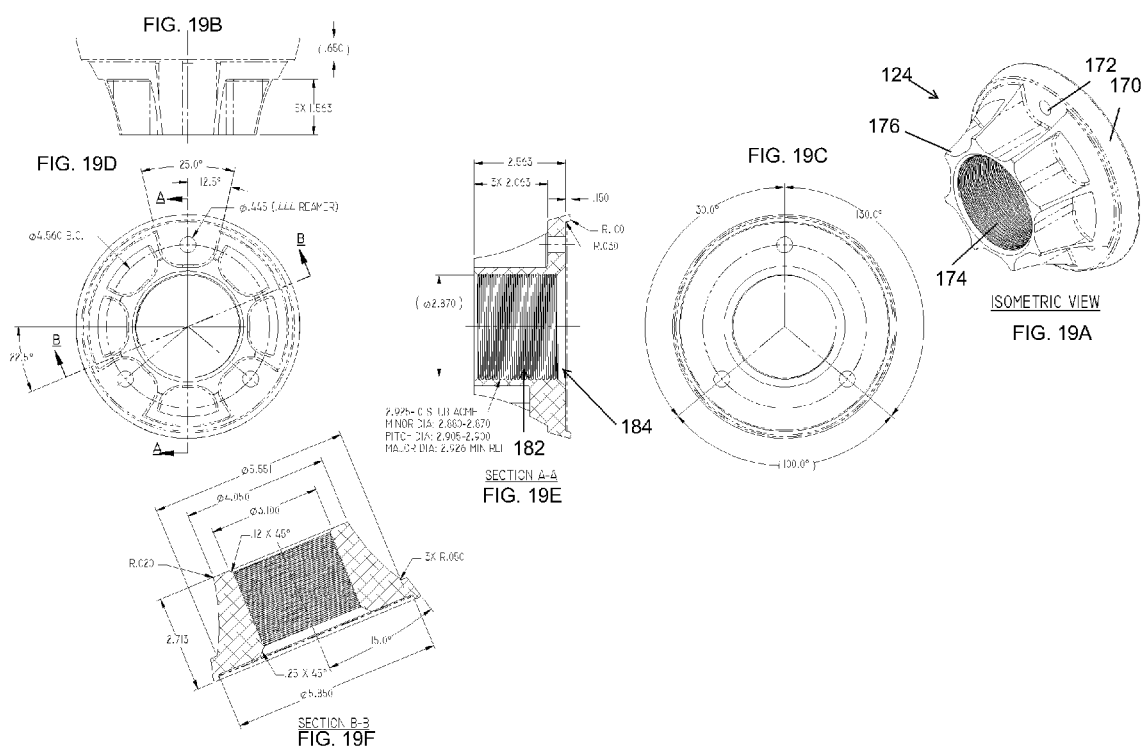
FIGS. 19A-19F are views of the female component of the strut spacer of FIG. 13.
Figure 20:
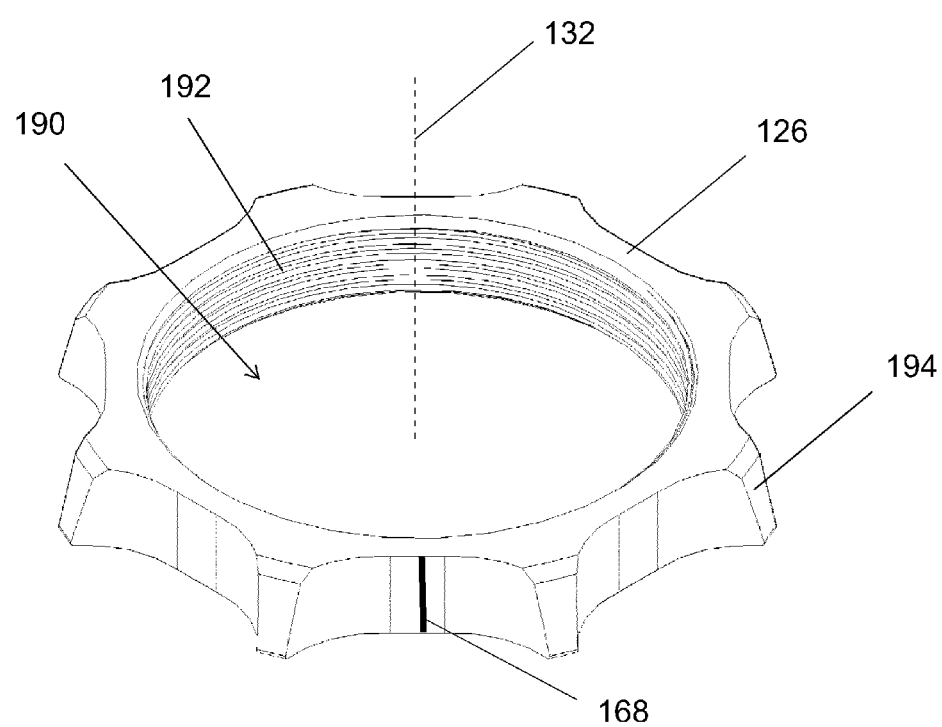
FIG. 20 is a perspective view of an optional locking ring of the strut spacer of FIG. 13.

The female component 124 is shown in greater detail in FIG. 18. The female component 124 can include a longitudinally extending portion 140 that extends along the longitudinal axis 138. The upper end of the longitudinally extending portion 140 can include an interface 170, which can include a plurality of holes 172. The interface 170 can include a plurality of ridges 176 that extend from the top surface 180 of the interface 170. The ridges 176 can form substantially U-shaped segments. In some embodiments, the ridges 176 reinforce the interface 170. The ridges 176 can facilitate the grip of the user when the user rotates components of the strut spacer 120. The ridges 176 can be evenly or unevenly spaced. The interface 170 can include eight ridges 176 but other configurations are contemplated (e.g., three, four, five, six, seven, nine, ten, etc.).

The female component 124 can have a lumen 174. The lumen 174 can extend through the entire female component 124, as shown. The female component 124 can include a complementary engagement feature 142. The complementary engagement feature 142 can be internal threads. The complementary engagement feature 142 can be disposed within the lumen 174. The complementary engagement feature 142 can be offset from the mounting surface 132.

FIGS. 19A-19F show views of the female component 124. FIG. 19A is an isometric view. FIG. 19B is a side view. FIG. 19C is the bottom view of the interface 170. The three holes 172 are not equally spaced around the circumference of the interface 170. The first set of holes can be separated by 130°, the second set of holes can be separated by 130°, and the third set of holes can be separated by 100°. The holes can match the pre-fabricated holes of the strut assembly. Other configurations are contemplated.

FIG. 19D is a top view of the female component 124. The holes 172 can have a diameter of 0.445" which can be formed from a 0.444" reamer. Other diameters of holes 146 are contemplated. The holes 146 are radially spaced along a diameter of 4.560" but other diameters are contemplated (e.g., 1.25", 1.5", 1.75", 2", 2.25", 2.5", 2.75", 3", 3.25" 3.5", 3.75", 4", 4.25", 4.5", 4.75", 5", 5.25", 5.5", 5.75", 6", 6.25", 6.5", 6.75", 7" etc.). This diameter can be selected to match the diameter of the pre-fabricated holes of the strut assembly. This diameter can be selected to be a sufficient distant from the edge of the interface 170 and the edge of the lumen 174. In some embodiments, this diameter can be equally spaced between the edge of the interface 170 and the edge of the lumen 174. The ridges 176 of the interface 180 are shown in FIG. 19D. The edges of an adjacent set of ridges 176 can encompass 25° but other angles are contemplated. FIG. 19E is the cross section view taken from line A-A and FIG. 19F is the cross-section view taken from line B-B.

FIGS. 19E and 19F show various dimensions of the female component 124. The length of the female component 124 can be 2.713" but other lengths are contemplated (e.g., 1", 1.25", 1.5", 1.75", 2", 2.25", 2.5", 2.75", 3", 3.25, 3.5", 3.75", 4", 4.25", 4.5", 4.75", 5", 5.25", 5.5", 5.75", 6", 6.25", 6.5", 6.75", 7" etc.). The female component 124 can be approximately the same length as the male component 122 but other configurations are contemplate (e.g., within 1" of the same length, within 2" of the same length, within 3" of the same length, within 4" of the same length, etc.). The inner diameter of the lumen 174 can be 2.870" but other diameters are contemplated (e.g., 1.25", 1.5", 1.75", 2", 2.25", 2.5", 2.75", 3", 3.25 3.5", 3.75", 4", 4.25", 4.5", 4.75", 5", 5.25", 5.5", 6", 6.25", 6.5", 6.75", 7" etc.). The inner diameter of the lumen 174 of the female component 124 can be approximate the same as the outer diameter of the longitudinally extending portion 134 of the male component 122. The major diameter can be 2.926". The pitch diameter can be 2.905-2.900". The minor diameter can be 2.880-2.870." Other configurations are contemplated.

The lumen 174 can include a first portion 182 near the upper end of the female component 124. The first portion 182 can include the engagement feature 142 (e.g., can be threaded). The diameter of the first portion 182 can be 2.870". The lumen 184 can include a second portion 184 near the lower end of the female component 124. The diameter of the second portion 184 can be greater than the diameter of the first portion 182. The complementary engagement feature 142 can extend along the first portion 182. Other diameters for any of the portions 182, 184 of the lumen 174 are contemplated (e.g., 0.25", 0.5", 0.75", 1", 1.25", 1.5", 1.75", 2", 2.25", 2.5", 2.75", 3", 3.25 3.5", 3.75", 4", 4.25", 4.5", 4.75", 5" etc.).

The female component 124 can have sections of reduced thickness in the vicinity of the holes 172. For instance the holes 172 can extend through 0.650" of the female component 124 but other thicknesses are contemplated (e.g., 0.25", 0.5", 0.75", 1", 1.25", 1.5", 1.75", 2", 2.25", 2.5" etc.). The illustrated embodiment has eight sections formed by the ridges 176, with three sections having reduced thickness in the vicinity of the holes 172. The other five sections formed by the ridges 176 can have a thickness of 1.563" but other thicknesses are contemplated (e.g., 0.25", 0.5", 0.75", 1", 1.25", 1.5", 1.75", 2", 2.25", 2.5" etc.). These areas of greater thickness can reinforce the interface 170. The bolts (not shown) can extend downward through the holes 172 and the interface 170. In this configuration, the bolts will not interfere with the male component 122. In other methods of use, the bolts extend in the opposite direction.

Referring back to FIGS. 16 and 18, in methods of use, the female component 124 can be advanced from the lower end of the male component 122 toward the interface 144. Alternatively, the male component 122 can be advanced from the upper end of the female component 124 toward the interface 170. The adjustment of the strut spacer 120 can be accomplished by rotating the male component 122, rotating the female component 124, or rotating both the female component 124 and the male component 122. The user adjusts the position of the male component 122 and the female component 124 until the upper mounting surface 130 and the lower mounting surface 132 are located in the desired position. The distance between the upper mounting surface 130 and the lower mounting surface 132 will be amount of lift provided by the strut spacer 120 when installed.

Figure 22:
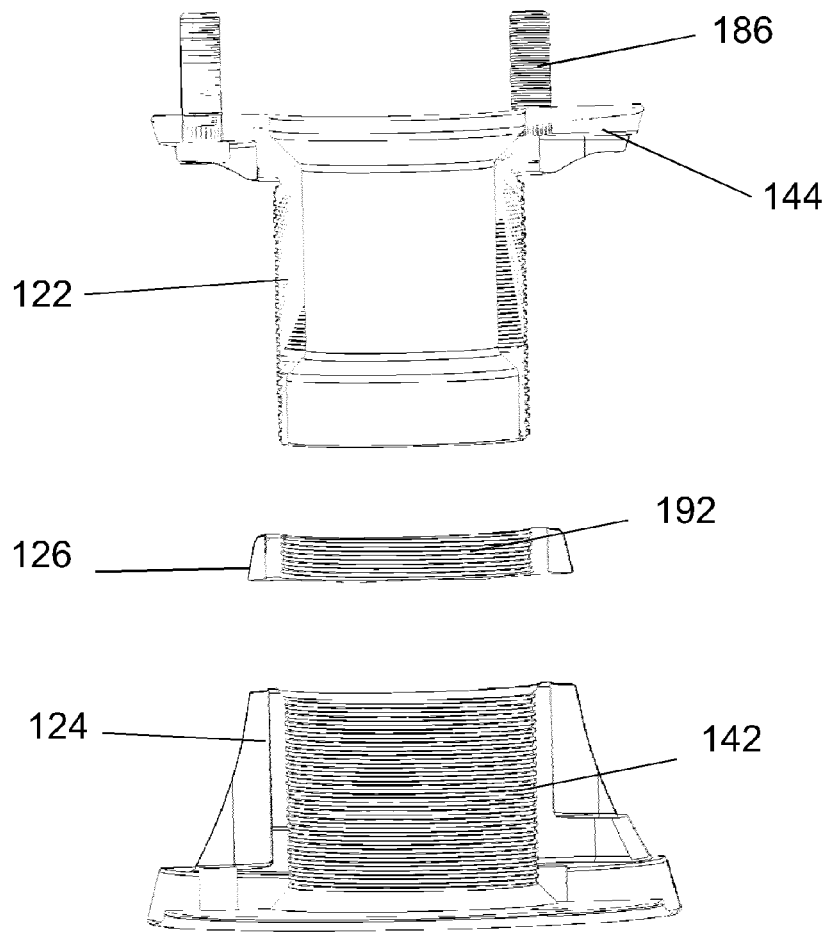
FIG. 22 is a cross-sectional, exploded view of the strut spacer of FIG. 13.
Figure 23:
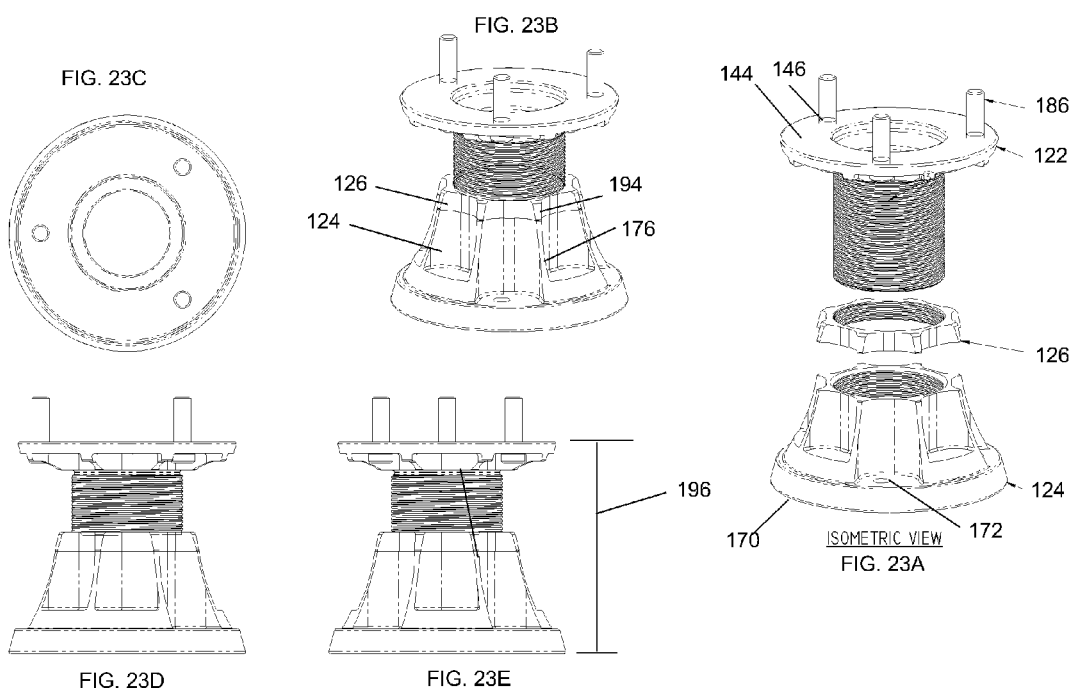
FIGS. 23A-23E are views of the strut spacer of FIG. 13.
Figure 24:
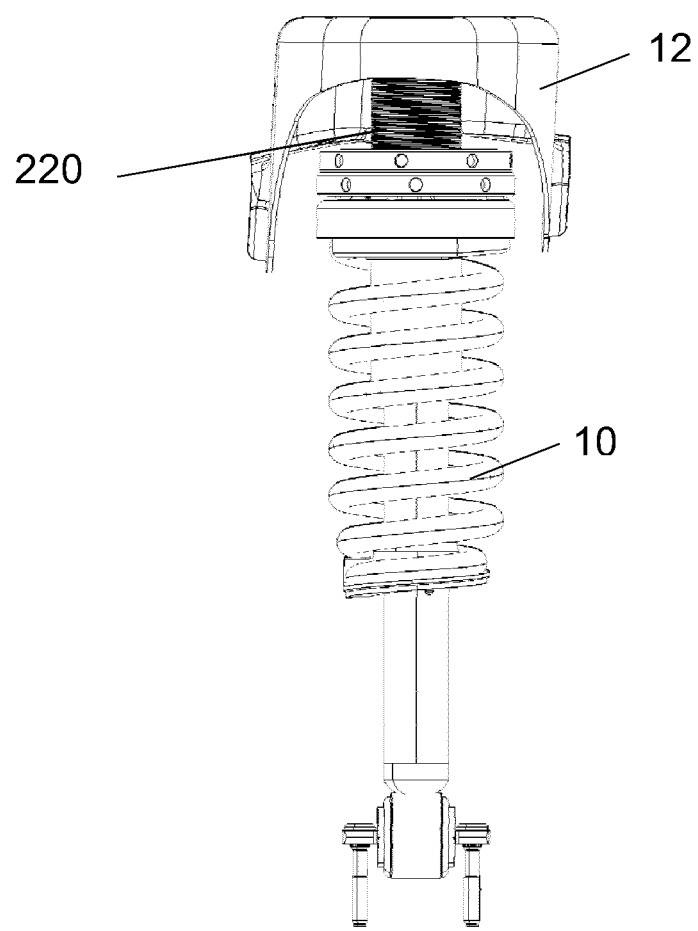
FIG. 24 is a perspective view of an embodiment of a strut spacer attached to a strut assembly and a frame.
Figure 25:
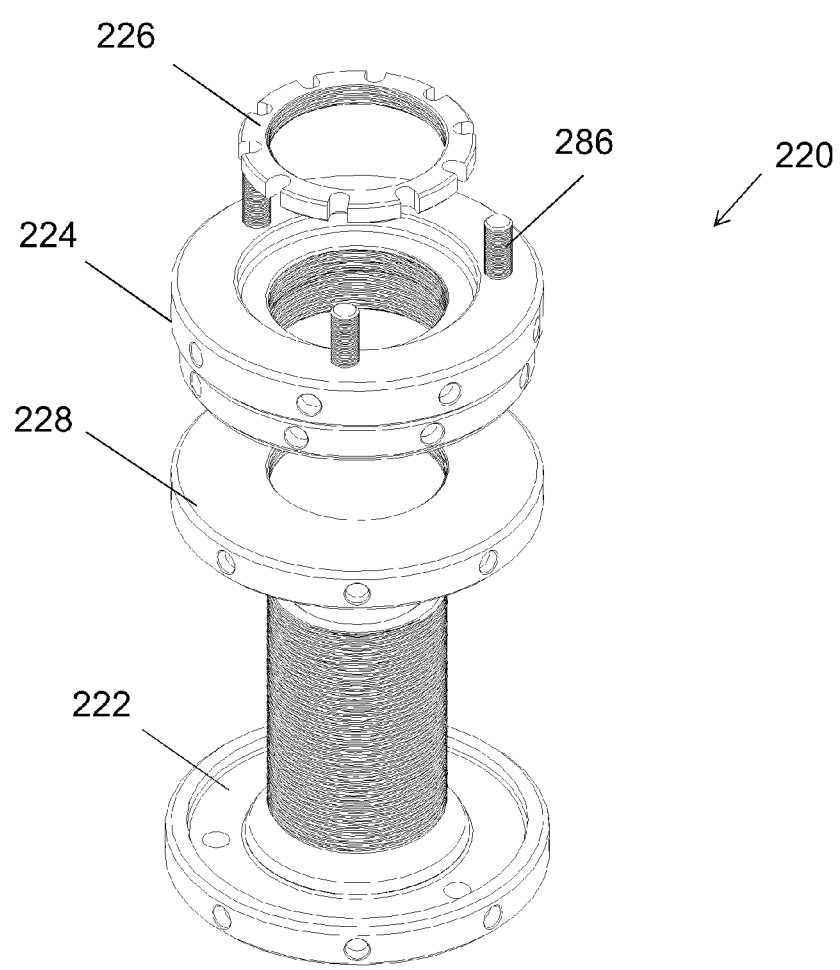
FIG. 25 is an exploded view of the strut spacer of FIG. 24.
Figure 26:
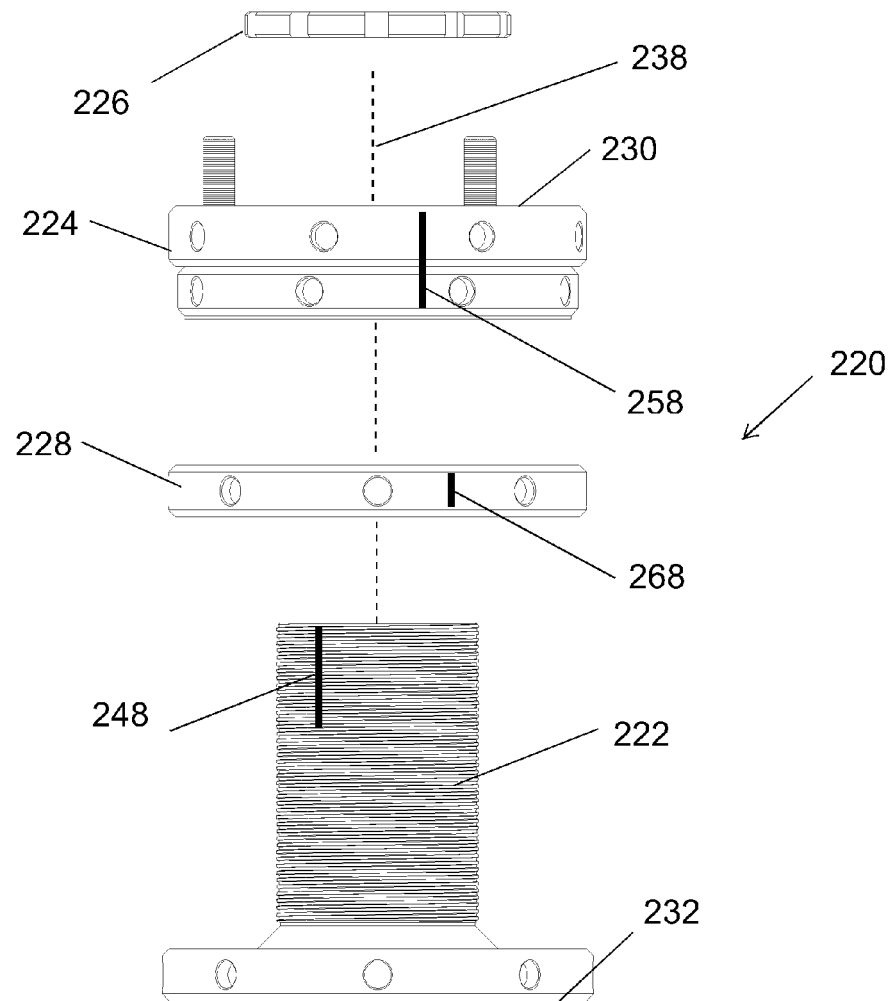
FIG. 26 is a front view of the strut spacer of FIG. 24.

During installation, bolts are extended through the holes 146, 172. FIG. 22 shows an upper set of bolts 186 extending through holes 146 and a similar or identical set of bolts can extend through holes 172. The bolts 186 can couple the interface 144 with the frame of the vehicle such that the upper mounting surface 130 is adjacent to the frame (not shown). The bolts 186 can couple the interface 170 with the strut assembly such that the lower mounting surface 132 is adjacent to the strut assembly (not shown). Once secured to the vehicle, the strut spacer 120 cannot be rotated to change the height of the strut spacer 120. For instance, the bolts 186 couple the interface 144 with the frame to counteract the male component 122 rotating. The bolts 186 couple the interface 170 with the strut assembly to counteract the female component 124 rotating. The bolts 186 counteract the adjustment of the male component 122 and the female component 124. Thus, in the illustrated configuration, the strut spacer 120 can be adjusted before using the bolts 186 to install the strut spacer 120 into the vehicle. The strut spacer 120 may be affixed to the strut assembly in a similar manner as the manufacturer secures the strut assembly to the frame (e.g., utilizing the same holes in the strut assembly and frame, utilizing the same bolts and nuts). The bolts 186 can be secured to the interfaces 144, 170 in any manner known in the art, including complementary nuts.

The strut spacer 120 can include a locking ring 126, which functions to lock the relative height of the female component 124 and the male component 122 before installation. The locking ring 126 is shown in greater detail in FIG. 20. The locking ring 126 can have a lumen 190. The lumen 190 of the locking ring 126 can align or substantially align with the lumen 174 of the female component 124. The lumen 190 can include a complementary engagement feature 192. The complementary engagement feature 192 of the locking ring 126 can be internal threads. The complementary engagement feature 192 of the locking ring 126 can couple with the engagement feature 136 of the male component 122.

The locking ring 126 can include a plurality of ridges 194 that extend generally from an upper surface of the locking ring 126 toward a lower surface of the locking ring 126. The ridges 194 can form substantially U-shaped segments. The ridges 194 can reinforce the locking ring 126. The ridges 194 can facilitate the grip of the user when the user rotates components of the strut spacer 120. For instance, the ridges 194 can facilitate the grip of the user when the user rotates the locking ring 126. The ridges 194 can facilitate holding the locking ring 126 stationary as the male component 122 or the female component 124 is rotated. The ridges 194 can be evenly or unevenly spaced. The locking ring 126 can include eight ridges 194 but other configurations are contemplated (e.g., three, four, five, six, seven, nine, ten, etc.).

The strut spacer 120 can include markings on one or more components. In some configurations, as shown in FIG. 14, the male component 122 includes a longitudinally extending line 148 or other marking(s) (e.g., line, dash, arrow, icon, graduated scale or the like) and the female component 124 includes a longitudinally extending line 158 or other marking(s) (e.g., line, dash, arrow, icon, graduated scale or the like). The longitudinally extending lines or markings 148, 158 can indicate when mounting holes 144 in the male component 122 align with mounting holes 172 in the female component 124. Aligning the markings 148, 158 can be a proxy for aligning the male component 122 and the female component 124 with pre-fabricated holes in the frame and strut assembly. In some configurations, the strut spacer 120 can include scale, or other indicia, to indicate the height of the strut spacer 120.

In some configurations, the locking ring 126 can include a longitudinally extending line 168 or marking. The marking 168 can indicate when the locking ring 126 is sufficiently tightened. The marking 168 of the locking ring 126 can align with the longitudinally extending line 148 or other marking of the male component 122 when the locking ring 126 is sufficiently tightened. The marking 168 of the locking ring 126 can align with the longitudinally extending line 158 or other marking of the female component 124 when the locking ring 126 is sufficiently tightened. This visual indicator can reduce or eliminate the likelihood of over tightening of the locking ring 126. In some configurations, the plurality of ridges 194 of the locking ring 126 can align or substantially align with the plurality of ridges 176 of the female component 124 when the locking ring 126 is sufficiently tightened. This visual indicator can reduce or eliminate the likelihood of over tightening of the locking ring 126. Over tightening can strip the threads on the strut spacer 120.

Figure 21A:
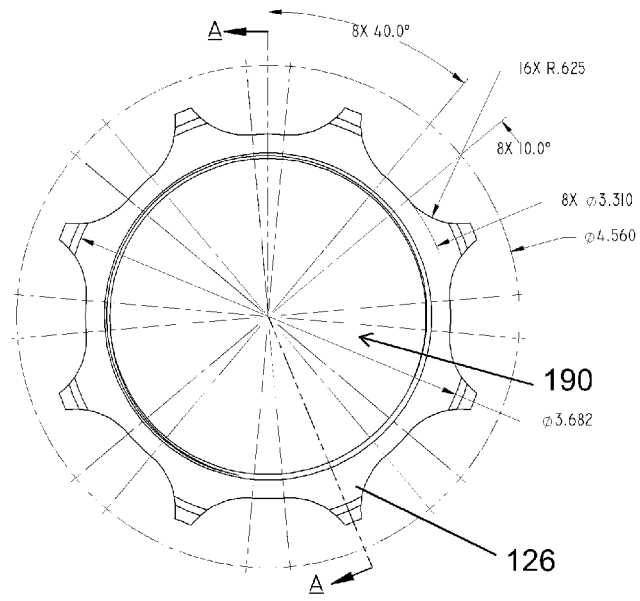
FIGS. 21A-21B are views of the optional locking ring of the strut spacer of FIG. 13.
Figure 21B:
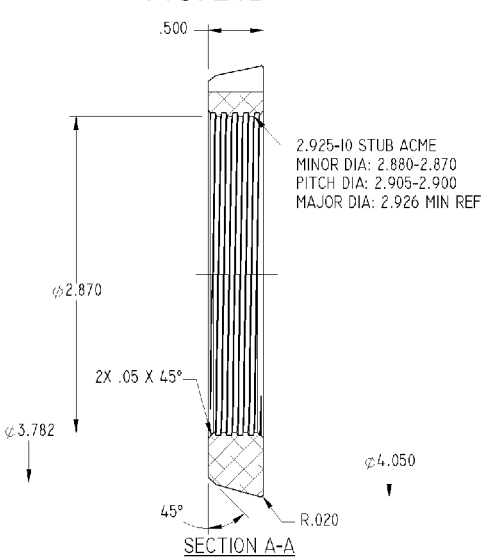

FIGS. 21A-21B show views of the locking ring 126. FIG. 21A is a top view. FIG. 21B is a cross-sectional view taken from line A-A. FIGS. 21A-21B show various dimensions of the locking ring 126. The height of the locking ring 126 can be 0.50" but other heights are contemplated (e.g., 0.25", 0.75", 1", 1.25", 1.5", 1.75", 2", 2.25", 2.5," etc.). The inner diameter of the lumen 190 can be 2.870" but other diameters are contemplated (e.g., 1.25", 1.5", 1.75", 2", 2.25", 2.5", 2.75", 3", 3.25" 3.5", 3.75", 4", 4.25", 4.5", 4.75", 5", 5.25", 5.5", 6", 6.25", 6.5", 6.75", 7" etc.). The inner diameter of the lumen 190 can be approximate the same as the outer diameter of the longitudinally extending portion 134 of the male component 122. The major diameter can be 2.926". The pitch diameter can be 2.905-2.900". The minor diameter can be 2.880-2.870." Other dimensions are contemplated.

The strut spacer 120 is shown in exploded cross-section in FIG. 22. The complementary engagement feature 192 of the locking ring 126 can be identical or substantially similar to the complementary engagement feature 142 of the female component 124. In the illustrated embodiment, the threads of the female component 124 and the locking ring 126 are identical (e.g., same size, same pitch, same material, etc.) The diameter of the lumen 174 of the female component 124 and the diameter of the lumen 190 of the locking ring 126 can be identical or substantially similar. FIG. 22 also shows the bolts 186. The bolts 186 can extend upward through the interface 144 as shown. In this configuration, the bolts 186 are less likely to interfere with the female component 124. In other methods of use, the bolts 186 extend in the opposite direction.

FIGS. 23A-23E show views of the strut spacer 120. FIG. 23A is an exploded isometric view. FIG. 23B is an assembled isometric view. FIG. 23C is the top view of the strut spacer 120. FIGS. 23D-23E are side views of the strut spacer 120. As shown in FIGS. 23B, 23D, 23E, the ridges 176 of the female component 124 align with the ridges 194 of the locking ring 126. The upper outer diameter of the female component 124 and the lower outer diameter of the locking ring 126 can be substantially identical such that the female component 124 and the locking ring form a smooth line.

In one method of use, the locking ring 126 can be advanced from the lower end of the male component 122 toward the interface 144. This can be accomplished by rotating the locking ring 126, rotating the male component 122, or rotating both the locking ring 126 and the male component 122. Then the female component 124 can be advanced from the lower end of the male component 122 toward the interface 144. This can be accomplished by rotating the female component 124, rotating the male component 122 or rotating both the female component 124 and the male component 122. In some methods of use, the locking ring 126 may need to be further advanced after the female component 124 is coupled to the male component 122. This can be accomplished by rotating the locking ring 126, rotating the male component 122 or rotating both the locking ring 126 and the male component 122.

Before installation, the user adjusts the position of the male component 122 and the female component 124 until the upper mounting surface 130 and the lower mounting surface 132 are located in the desired position. The distance 196 between the upper mounting surface 130 and the lower mounting surface 132 will be equal to the amount of lift provided by the strut spacer 20 when installed, as shown in FIG. 23E. During installation, one or more bolts 186 are extended through the holes 146, 172 in the interfaces 144, 170. In some configurations, the upper set of bolts 186 couple the interface 144 with the frame of the vehicle (not shown). The lower set of bolts 186 couple the interface 170 with the strut assembly (not shown).

The locking ring 126 can be used to substantially prevent rotation of the female component 124 and the male component 122 and to lock the height of the strut spacer 120 before installation. In some methods of use, the locking ring 126 can be used before the bolts 186 extend through the holes 146 and 172 prior to installation. In other methods of use, the locking ring 126 can be adjusted after the bolts extend through the holes 146 and 172 after installation. To lock the strut spacer 120 before installation, the locking ring 126 can be advanced toward the lower end of the male component 122 away from the interface 144. The locking ring 126 can be placed in abutment with the female component 124. This action frictionally locks the strut spacer 120 in the desired orientation before installation. The female component 124 and the locking ring 126 are used together to reduce or eliminate the likelihood of self-loosening before installation.

In use, the male component 122 and the female component 124 would be adjusted to the desired height while the strut spacer 120 is off the vehicle, in an uninstalled condition. In the uninstalled condition, the male component 122 can rotate and the female component 124 can rotate. In the uninstalled condition, neither the male component 122 nor the female component 124 are constrained in movement by being fixed to the vehicle. In the uninstalled condition, the male component 122 is not coupled to the frame and the female component 124 is not coupled to the strut assembly. In use, one or more strut spacers 120 may be adjusted to the same height. For instance, in some methods of a pair of strut spacers 120 is adjusted to the same height. The height can be measured through any method known in the art.

With reference to FIGS. 24-34F, a strut spacer 220 is shown. The strut spacer 220 is shown coupled to a strut assembly 10 and a frame 12. The strut spacer 220 has components that function in a similar manner as components of strut spacers 20, 120. Similar features will have similar reference numbers. The strut spacer 220 can include a male component 222 and a female component 224. Through the use of these two components, the height or length of the strut spacer 220 can be adjusted.

The strut spacer 220 is referred to as having an upper end near the frame and a lower end near the strut assembly. The strut spacer 220 has a longitudinal axis 238 which extends from the upper end to the lower end. The strut spacer 220 is designed to adjust the relative distance between an upper mounting surface 230 and a lower mounting surface 232. The strut spacer 220 permits adjustment of the distance between the mounting surfaces 230, 232 of the strut spacer 220 by adjusting the male component 222 relative to the female component 224 or the female component 224 relative to the male component 222.

The strut spacer 220 can be installed in the vehicle in the orientation shown in FIGS. 24-27. Therefore, the upper mounting surface 230 is a surface of the female component 224 and the lower mounting surface 232 is a surface of the male component 222. The female component 224 can be near the upper end of the strut spacer 220 and the male component 222 can be near the lower end of the strut spacer 220. In this orientation, the upper mounting surface 230 can be coupled to the frame (not shown). The lower mounting surface 232 can be coupled to the strut assembly of the vehicle (not shown). A second set of bolts 286 (not shown) extend through the male component 222. The opposite orientation is possible, wherein the male component 222 couples to the frame and the female component 224 couples to the strut assembly.

Figure 28:
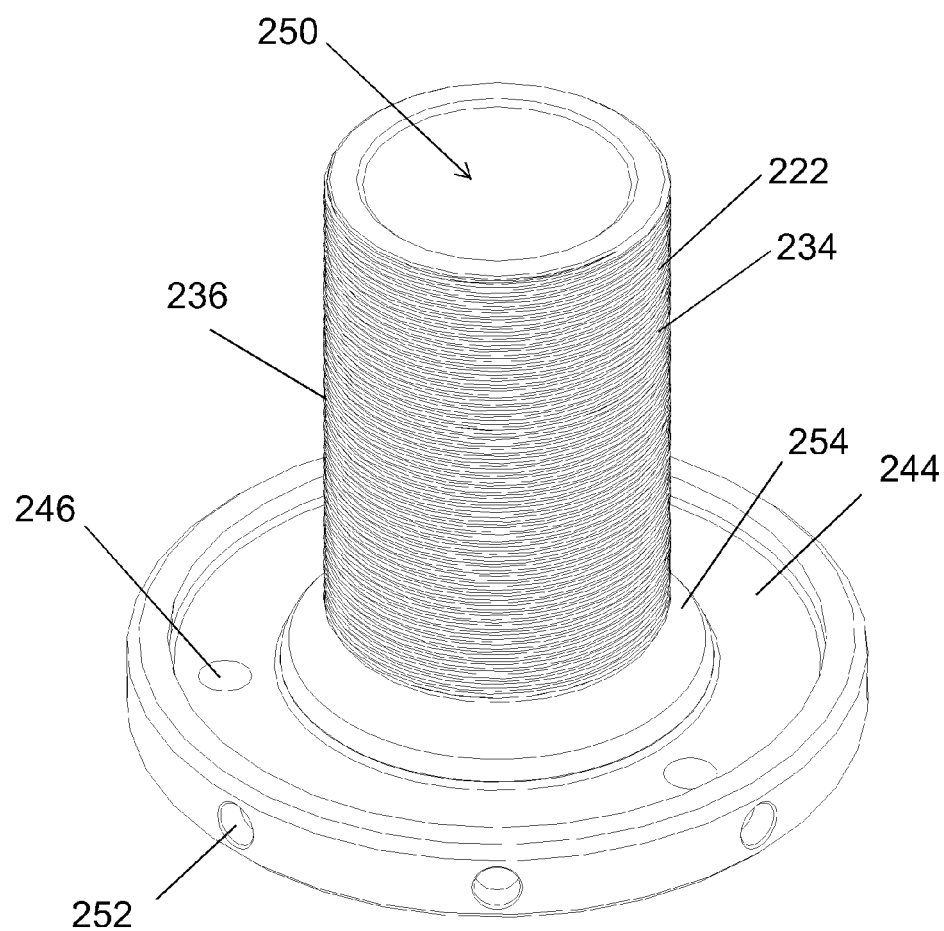
FIG. 28 is a perspective view of a male component of the strut spacer of FIG. 24.

As shown in FIG. 28, the male component 222 can include a longitudinally extending portion 234, which can include an engagement feature 236. The engagement feature 236 can be external threads. The male component 222 can include an interface 244 which can include a plurality of holes 246. The interface 244 of the male component 222 and/or the longitudinally extending portion 234 can include recesses 252. The recesses 252 can be designed to engage a tool. For instances, the recesses 252 can be designed as a socket configured to mate with common types of screwdrivers or punch (e.g., hex head, fluted, square, Philips©, slotted, 5-node). In the illustrated embodiment, the tool to engage the recesses 252 is not specially designed. In other methods of use, the user rotates the male component 222 by hand.

The male component 222 can include a lumen 250. The lumen 250 can be sized to accept a portion of the strut assembly, for instance the pre-fabricated strut cap. The lumen 250 can include a taper 254 near the lower mounting surface 232 to ease the entry of the strut assembly within the lumen 250. The male component 222 can be reinforced in the area configured to accept the strut assembly (e.g., greater thickness).

Figure 29:
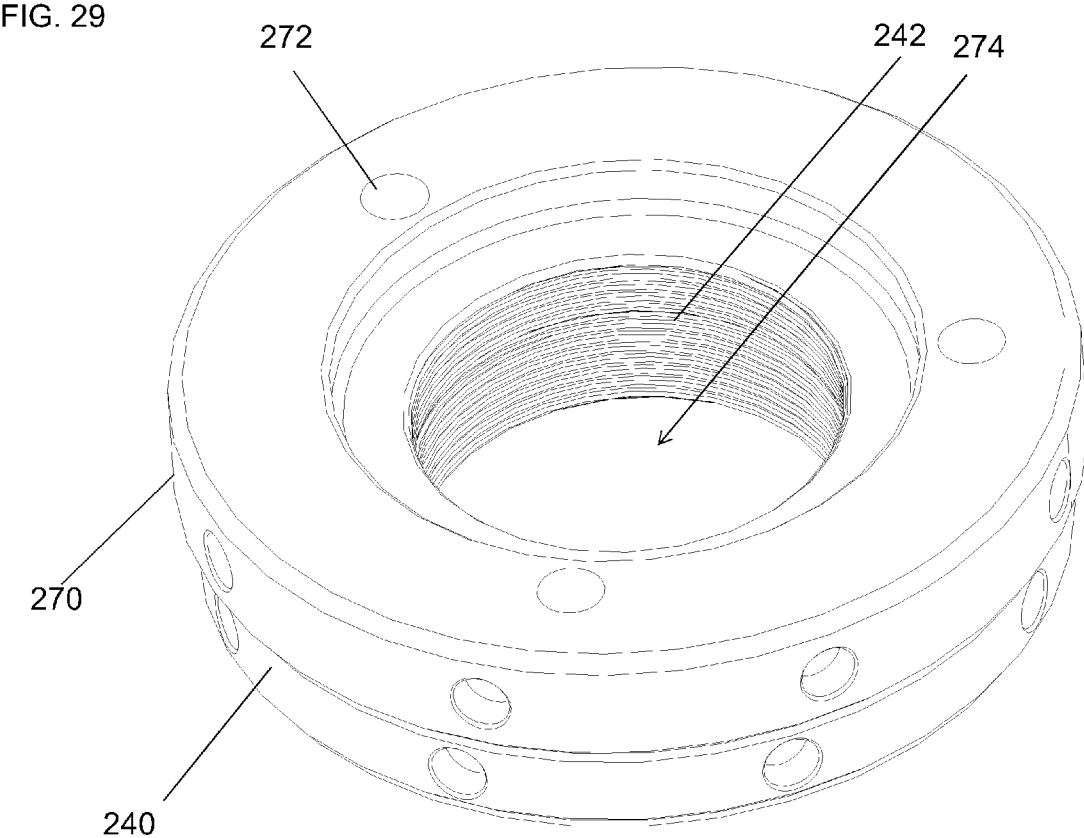
FIG. 29 is a perspective view of a female component of the strut spacer of FIG. 24.
Figure 30:
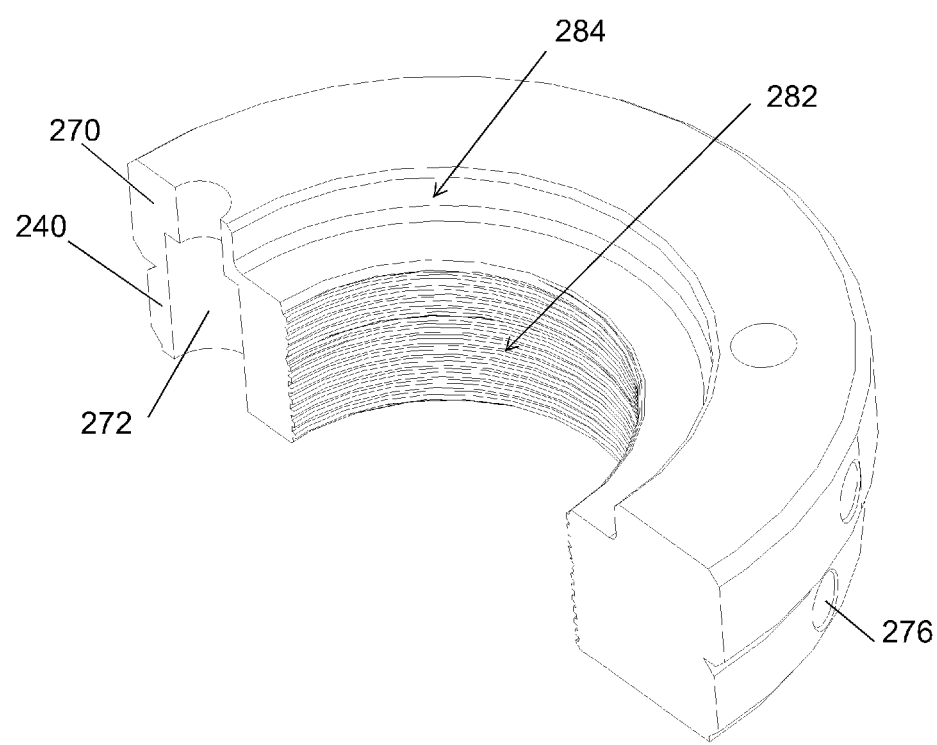
FIG. 30 is a cross-sectional view of a female component of the strut spacer of FIG. 24.

The female component is shown in greater detail in FIGS. 29-30. The female component 224 can include a longitudinally extending portion 240 that extends along the longitudinal axis 238. The upper end of the longitudinally extending portion 240 can include an interface 270, which can include a plurality of holes 272. The female component 224 can have a lumen 274. The lumen 274 can extend through the entire female component 224, as shown. The female component 224 can include a complementary engagement feature 242. The complementary engagement feature 242 can be internal threads. The complementary engagement feature 242 can be disposed within the lumen 274.

The lumen 274 can include a first portion 282 extending from the lower end of the female component 224. The first portion 282 can include the complementary engagement feature 242. For instance, the first portion 282 can be threaded. The complementary engagement feature 242 disposed along the first portion 282 is configured to engage the engagement feature 236 of the male component 222. The lumen 274 can include a second portion 284 extending from upper end of the female component 224. The diameter of the second portion 284 can be greater than the diameter of the first portion 282. The first portion 282 of the lumen 274 can be disposed in the longitudinal extending portion 240, or a section thereof. The first portion 282 of the lumen 274 can be disposed in the interface 270, or a section thereof. The edge between the first portion 282 and the second portion 284 of the lumen may not align with the edge between the interface 270 and the longitudinally extending portion 240. The female component 224 can include appropriately sized through holes 222 to accommodate the head of the bolts 286.

The interface 270 and/or the longitudinally extending portion 240 of the female component 224 can include recesses 276. The recesses 276 can be designed to engage a tool. For instances, the recesses 276 can be designed as a socket configured to mate with common types of screwdrivers or punch.

The strut spacer 220 can include a locking ring 226, which functions to lock the relative height of the female component 224 and the male component 222 before installation. The locking ring 226 is shown in greater detail in FIG. 31. The locking ring 226 can have a lumen 290. The lumen 290 can include a complementary engagement feature 292. The complementary engagement feature 292 of the locking ring 226 can be internal threads. The complementary engagement feature 292 of the locking ring 226 can couple with the engagement feature 236 of the male component 222. The locking ring 226 can rotate within the second portion 284 of the lumen 274. The locking ring 226 can include one or more recesses 294. For instance, the recesses 294 of the locking ring 226 can include one or more sockets configured to engage a screwdriver (e.g., hex head, fluted, square, Philips©, slotted, 5-node, etc.), punch or specially designed tool to rotate the locking ring 222. The recesses 294 can facilitate movement of the locking ring 226 within the second portion 284 of the lumen 274.

Referring back to FIG. 26, the strut spacer 220 can include markings on one or more components. In some configurations, the male component 222 includes a longitudinally extending line 248 or other marking(s) (e.g., line, dash, arrow, icon, graduated scale or the like) and the female component 224 includes a longitudinally extending line 258 or other marking(s) (e.g., line, dash, arrow, icon, graduated scale or the like). The longitudinally extending lines or markings 248, 258 can indicate when mounting holes in the male component 222 align with mounting holes in the female component 224. Aligning the markings 248, 258 can be a proxy for aligning the male component 222 and the female component 224 with pre-fabricated holes in the frame and strut assembly.

Figure 31:
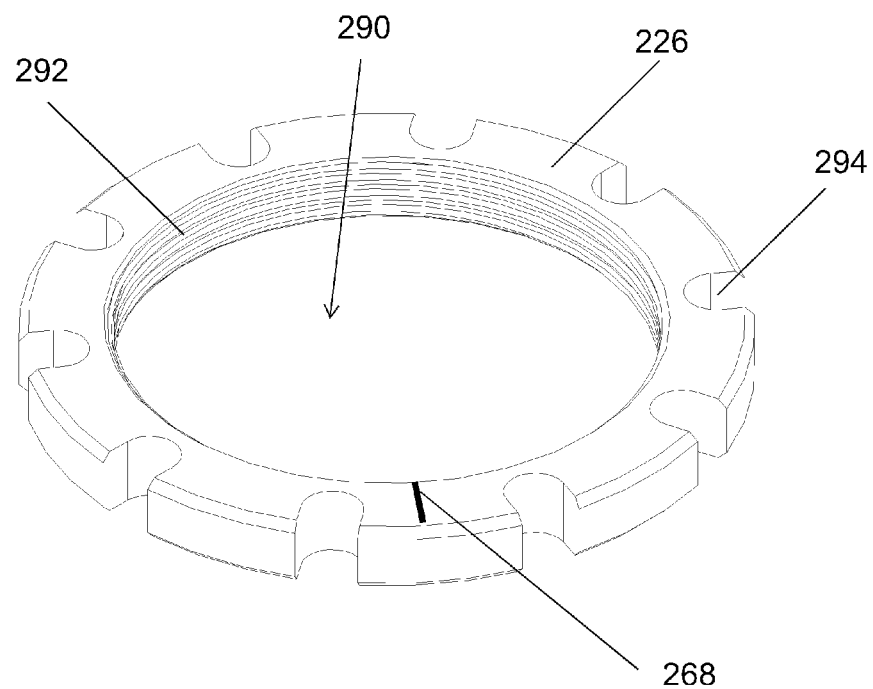
FIG. 31 is a perspective view of an optional locking ring of the strut spacer of FIG. 24.

In some configurations, the locking ring 226 can include a marking 268 (e.g., a horizontally extending line) as shown in FIG. 31. The marking 268 can indicate when the locking ring 226 is sufficiently tightened. The marking 268 of the locking ring 226 can align with the longitudinally extending lines 258 or other marking (e.g., a horizontally extending line) of the female component 224 when the locking ring 226 is sufficiently tightened. This visual indicator can reduce or eliminate the likelihood of over tightening of the locking ring 226. In some configurations, the strut spacer 220 can include scale, or other indicia, to indicate the height of the strut spacer 220.

In one method of use, the user adjusts the position of the male component 222 and the female component 224 until the upper mounting surface 230 and the lower mounting surface 232 are located in the desired position before installation. The distance 296 between the upper mounting surface 230 and the lower mounting surface 232 will be equal to the amount of lift provided by the strut spacer 220 when installed.

The locking ring 226 can be advanced from the upper end of the female component 224 toward the male component 222, within the second portion 284 of the lumen 274. This can be accomplished by rotating the locking ring 226 along the longitudinal axis 238. To lock the strut spacer 220 before installation, the locking ring 226 can be advanced toward the lower end of the female component 224. The locking ring 226 can be placed in abutment with the first portion 282 of the lumen 274, which has a smaller diameter than the second portion 284 of the lumen 274. This action frictionally locks the strut spacer 220 in the desired orientation before installation. The female component 224 and the locking ring 226 are used together to reduce or eliminate the likelihood of self-loosening before installation. Other steps or methods of use described in relationship to strut spacer 20 can be applicable to strut spacer 220.

Figure 32:
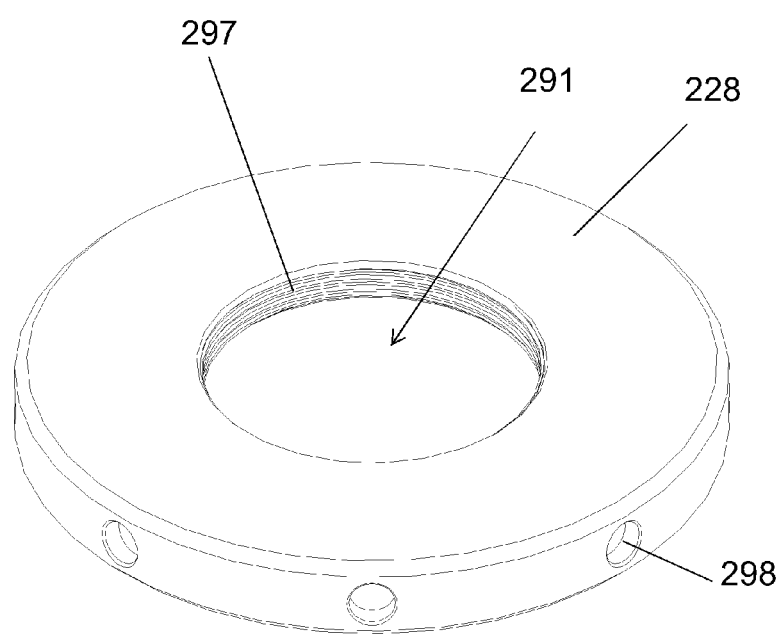
FIG. 32 is a perspective view of an optional cover of the strut spacer of FIG. 24.
Figure 33:
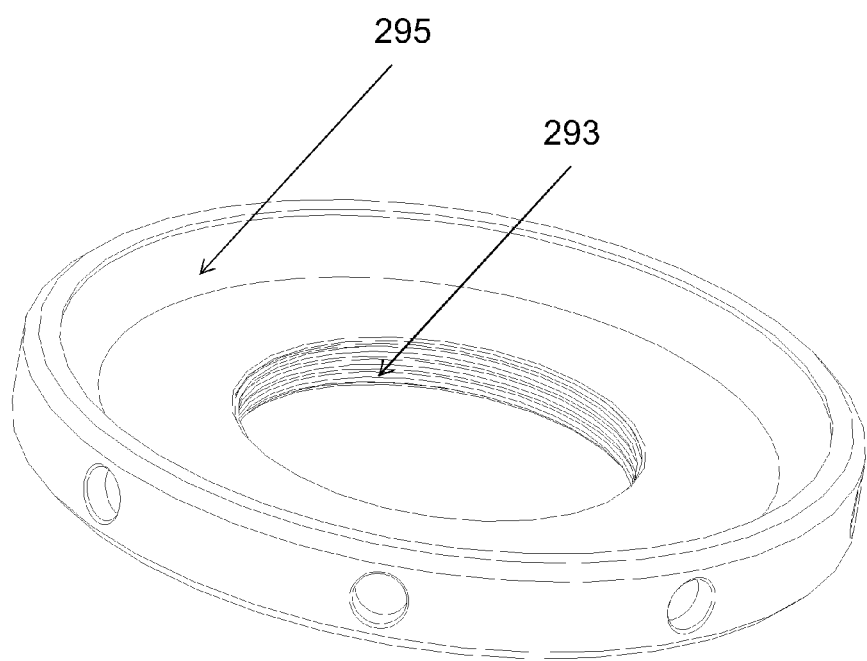
FIG. 33 is a perspective view of an optional cover of the strut spacer of FIG. 24.
Figure 34:
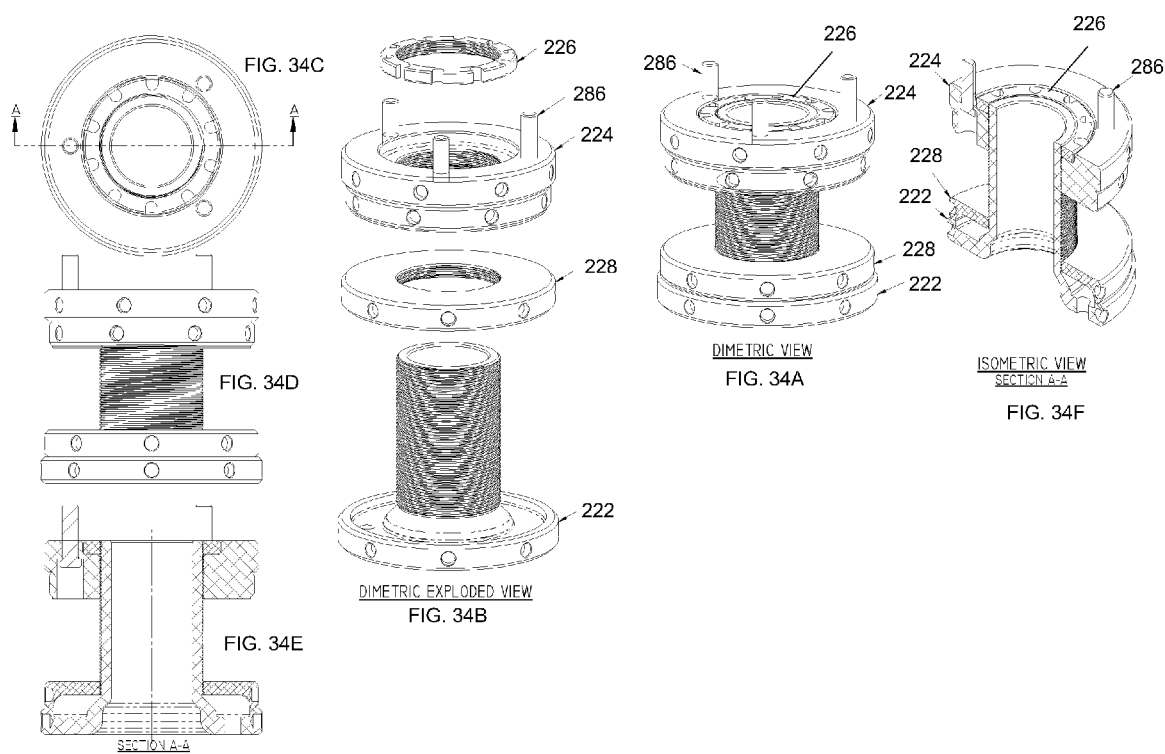
FIG. 34A-34F are views of the strut spacer of FIG. 24.

The strut spacer 220 can include the cover 228, which is shown in greater detail in FIGS. 32-33. The cover 228 can have a lumen 291. The lumen 291 can have a first portion 293 that can align or substantially align with the lumen 274 of the female component 224. The lumen 291 can have a second portion 295 having a greater diameter than the first portion. The second portion 295 can accommodate the heads of the bolts 286 extending through the male component 222. The cover 228 can include a complementary engagement feature 297. The complementary engagement feature 297 of the cover 228 can be threads, as shown. The cover 228 can include a plurality of recesses 298 that extend generally from a side surface of the cover 228. The recesses 298 can facilitate the grip of the user when the user rotates components of the strut spacer 220.

FIGS. 34A-34F show views of the strut spacer 220. FIG. 34A is an assembled isometric view. FIG. 34B is an exploded isometric view. FIG. 23C is the top view of the strut spacer 220. FIG. 23D is a side views of the strut spacer 220. FIGS. 34E-34F are cross section views.

Figure 35:
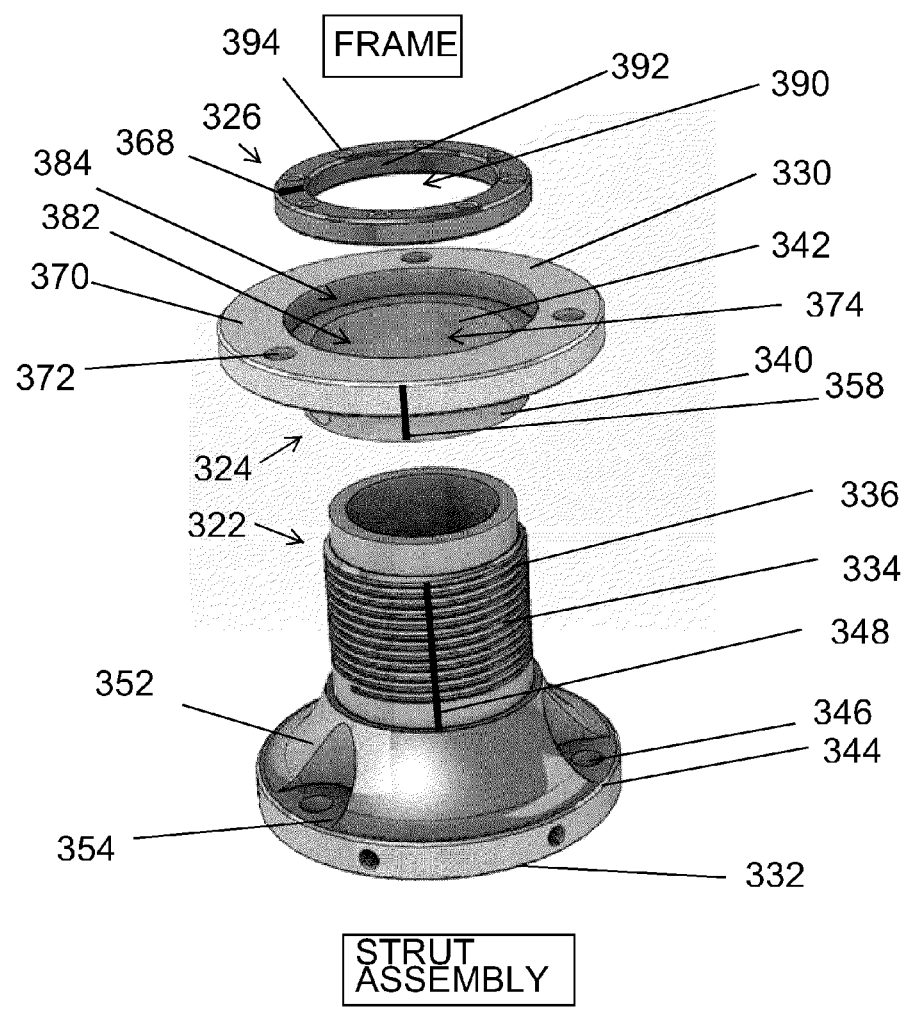
FIG. 35 is a perspective view of an embodiment of a strut spacer.
Figure 36:
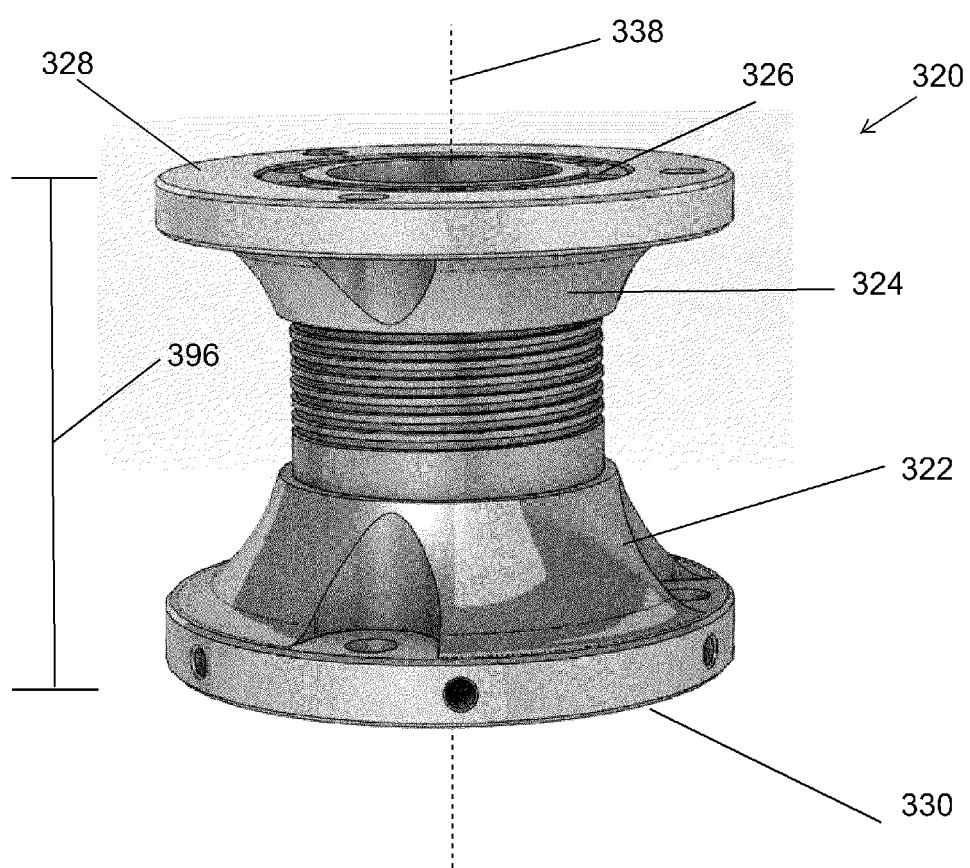
FIG. 36 is an exploded view of the strut spacer of FIG. 35.

With reference to FIGS. 35-36, a strut spacer 320 is shown. The strut spacer 320 has components that function in a similar manner as components of strut spacers 20, 120, 220. Similar features will have similar reference numbers. The strut spacer 320 can include a male component 322 and a female component 324. Through the use of these two components, the height or length of the strut spacer 320 can be adjusted. The locking ring 326 can include one or more recesses 394. For instance, the recesses 394 of the locking ring 326 can include one or more sockets configured to engage a screwdriver (e.g., hex head, fluted, square, Philips©, slotted, 5-node, etc.), punch or specially designed tool to rotate the locking ring 326. The recesses 394 can facilitate movement of the locking ring 326 within a second portion 384 of a lumen 374 of the female component 324. The recesses 394 can be located on an upper surface of the locking ring 326.

Any of the components described herein can be manufactured in any number of subcomponents that together create the component shown and described herein. In some embodiments, the male component 22 can include two or more subcomponents. For instance, a first subcomponent can include the longitudinally extending portion 34 and the engagement feature 36. The second subcomponent can include the interface 44. In some embodiments, the subcomponents can be joined at the upper end of the taper 54 or at the lower end of the taper 54. In some embodiments, the female component 124 can include two or more subcomponents. For instance, a first subcomponent can include the longitudinally extending portion 140. The second subcomponent can include the interface 170. In some embodiments, the subcomponents can be joined at the any position along the length of the female component 124. Other combinations of subcomponents are contemplated for the male components, the female components, the locking rings, and the covers described herein.

The subcomponents can be coupled by any type of connection including threads, ratchet, detents, snap fit, bayonet, etc. In some embodiments, the subcomponents are releasably coupled. For instance, the first subcomponents described above can include male threads and the second subcomponents described above can include female threads. The subcomponents can be coupled via the threads form a unitary structure. The subcomponents can be joined by any type of physical connection including welding, adhesive, etc. In some embodiments, the subcomponents form a unitary or monolithic component as illustrated in the figures. For instance, the components described herein can be cast or machined from a unitary piece of material.

Any of the components described herein can be manufactured of any number of subcomponents (e.g., one, two, three, four, five, six, seven, eight, etc.). The components described herein can be divided into subcomponents along a plane encompassing the longitudinal axis 38 (e.g., mirror image subcomponents). The components described herein can be divided into subcomponents along a plane encompassing an axis that is transverse to the longitudinal axis. The subcomponents can be approximately equal in size. The subcomponents can have different sizes or shapes.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. For example, any of the disclosed male components can be used with any of the disclosed female components. The cover can be used in combination with any strut spacer disclosed herein. In particular, while the present strut spacers have been described in the context of particularly preferred embodiments, the skilled artisan will appreciate, in view of the present disclosure, that certain advantages, features and aspects of the assemblies may be realized in a variety of other applications, many of which have been noted above. For example, in some embodiments the complementary engagement features of the female component can be disposed on a separate component (e.g., a nut, a second locking ring) that can be removable coupled to the female component (e.g., via bolts, screws, fasteners). For example, in some embodiments the female component is not threaded. The male component can project through the non-threaded female component and the female component can be freely slidable on the male component. The male component can engage via threads the separate component. The separate component can then couple to the female component to form a unitary structure. A locking ring as disclosed herein can be utilized to minimize self-loosening before installation. Other configurations also can be contemplated. Additionally, it is contemplated that various aspects and features of the invention described can be practiced separately, combined together, or substituted for one another, and that a variety of combination and sub combinations of the features and aspects can be made and still fall within the scope of the invention. Thus, it is intended that the scope of the present invention herein disclosed should not be limited by the particular disclosed embodiments described above, but should be determined only by a fair reading of the claims.

What is claimed is:

1. A strut spacer for use with a strut assembly and a frame of a motor vehicle comprising:
   a first component comprising an externally threaded surface and a first set of holes configured to align with the pre-fabricated holes in the strut assembly;
   a second component comprising an internally threaded surface, wherein the internally threaded surface of the second component is configured to engage the externally threaded surface of the first component, wherein the second component has a second set of holes configured to align with pre-fabricated holes in the frame; and
   wherein rotation of the first component or the second component adjusts the height of the strut spacer prior to installation within the motor vehicle;
   wherein the first component has a longitudinally extending line;
   wherein the second component has a marking, wherein aligning the longitudinally extending line with the marking aligns the first set of holes and the second set of holes.

2. The strut spacer of claim 1, wherein the first component comprises an outward extending flange.

3. The strut spacer of claim 1, wherein the second component comprises an outward extending flange.

4. A strut spacer for use with a strut assembly and a frame of a motor vehicle comprising:
   a first component comprising an externally threaded surface and a first set of holes configured to align with the pre-fabricated holes in the strut assembly;
   a second component comprising an internally threaded surface, wherein the internally threaded surface of the second component is configured to engage the externally threaded surface of the first component, wherein the second component has a second set of holes configured to align with pre-fabricated holes in the frame; and
   wherein rotation of the first component or the second component adjusts the height of the strut spacer prior to installation within the motor vehicle,
   wherein a distance between a mounting surface of the first component and a mounting surface of the second component is the height of the strut spacer.

5. The strut spacer of claim 4, wherein the strut spacer comprises aluminum.

6. The strut spacer of claim 4, wherein all the external threads have the same diameter and all the internal threads have the same diameter.

7. A strut spacer comprising:
   a first component comprising a threaded surface and a set of holes configured to align with pre-fabricated holes in a strut assembly;
   a second component comprising a threaded surface, wherein the threaded surface of the second component is configured to engage the threaded surface of the first component, wherein the second component has a set of holes configured to align with prefabricated holes in a frame of a motor vehicle, wherein rotation of the first component or the second component adjusts the height of the strut spacer;
   a third component comprising a threaded surface, wherein rotation of the third component locks the relative movement between the first component and the second component, wherein at least one of the first component and the second component has a marking; and
   a cover, wherein the cover can engage the first component or the second component to cover the holes in the first component or the second component.

8. The strut spacer of claim 7, wherein the threaded surface of the third component comprises an internally threaded surface.

9. The strut spacer of claim 7, wherein one of the threaded surface of the first component and the threaded surface of the second component is externally threaded and the other one of the threaded surface of the first component and the threaded surface of the second component is internally threaded.

10. The strut space of claim 7, wherein the first component comprises a through lumen and the second component comprises a through lumen.

11. The strut spacer of claim 7, wherein a distance between a mounting surface of the first component and a mounting surface of the second component is the height of the strut spacer.

12. The strut spacer of claim 7, wherein a side surface of the first component comprises a plurality of recesses and a side of the second component comprises a plurality of recesses.

13. A strut spacer comprising:
a first component comprising a threaded surface and a set of holes configured to align with pre-fabricated holes in a strut assembly;
a second component comprising a threaded surface, wherein the threaded surface of the second component is configured to engage the threaded surface of the first component, wherein the second component has a set of holes configured to align with prefabricated holes in a frame of a motor vehicle, wherein rotation of the first component or the second component adjusts the height of the strut spacer; and
a third component comprising a threaded surface, wherein rotation of the third component locks the relative movement between the first component and the second component,
wherein the first component has a first marking and the second component has a second marking, wherein the first marking is configured to align with the second marking when the first set of holes aligns with the second set of holes.

14. The strut spacer of claim 13, wherein the first component comprises a through lumen and the second component comprises a through lumen.

15. The strut spacer of claim 13, further comprising a cover, wherein the cover can engage the first component or the second component to cover the holes in the first component or the second component.

16. The strut spacer of claim 13, wherein a distance between a mounting surface of the first component and a mounting surface of the second component is the height of the strut spacer.

17. The strut spacer of claim 13, wherein a side surface of the first component comprises a plurality of recesses and a side of the second component comprises a plurality of recesses.

18. A strut spacer comprising:
a first component comprising an externally threaded surface and a first set of holes configured to align with pre-fabricated holes in a strut assembly or a frame of a vehicle;
a second component comprising an internally threaded surface, wherein the internally threaded surface of the second component is configured to engage the externally threaded surface of the first component, wherein the second component has a second set of holes configured to align with pre-fabricated holes in the strut assembly or the frame of the vehicle; and
wherein rotation of the first component or the second component adjusts the height of the strut spacer,
wherein the first component comprises a bolt extending through one of the holes of the first set of holes, and a cover, wherein the cover reduces the likelihood of the bolt backing out.

19. The strut spacer of claim 18, further comprising a third component configured to lock the relative movement between the first component and the second component.

20. The strut spacer of claim 18, wherein the first component comprises a bolt configured to extend through a hole of the first set of holes and a pre-fabricated hole of the prefabricated holes in the strut assembly or the frame of the vehicle.

* * * * *